(12) United States Patent
Yoshizawa et al.

(10) Patent No.: US 9,540,006 B2
(45) Date of Patent: Jan. 10, 2017

(54) WORK VEHICLE AND CONTROL METHOD THEREOF

(71) Applicant: KOMATSU LTD., Tokyo (JP)

(72) Inventors: Masao Yoshizawa, Hiratsuka (JP); Yasuo Fujiwara, Hiratsuka (JP); Shunsuke Miyamoto, Atsugi (JP)

(73) Assignee: KOMATSU LTD., Tokyo (JP)

( * ) Notice: Subject to any disclaimer, the term of this patent is extended or adjusted under 35 U.S.C. 154(b) by 27 days.

(21) Appl. No.: 14/762,514

(22) PCT Filed: Nov. 25, 2014

(86) PCT No.: PCT/JP2014/081055
§ 371 (c)(1),
(2) Date: Jul. 22, 2015

(87) PCT Pub. No.: WO2015/068861
PCT Pub. Date: May 14, 2015

(65) Prior Publication Data
US 2015/0367851 A1 Dec. 24, 2015

(30) Foreign Application Priority Data
Dec. 13, 2013 (JP) .................................. 2013-257968

(51) Int. Cl.
*B60W 30/18* (2012.01)
*B60K 6/445* (2007.10)
(Continued)

(52) U.S. Cl.
CPC .............. *B60W 30/18* (2013.01); *B60K 6/387* (2013.01); *B60K 6/445* (2013.01); *B60K 6/54* (2013.01);
(Continued)

(58) Field of Classification Search
CPC ...... B60W 30/18; B60W 10/08; B60W 10/10; B60W 20/00; B60W 30/18045; B60K 6/387; B60K 6/445; B60K 6/54; E02F 9/202; E02F 9/2037; E02F 9/2058; E02F 9/2079; E02F 9/2253; E02F 9/2292; E02F 9/2296; F16H 61/02; F16H 61/66
See application file for complete search history.

(56) References Cited

U.S. PATENT DOCUMENTS 5,403,244 A * 4/1995 Tankersley ............... B60K 1/00
180/65.265
7,497,285 B1 * 3/2009 Radev ...................... B60K 6/26
180/65.225
(Continued)

FOREIGN PATENT DOCUMENTS

DE 10 2011 115 002 A1 4/2013
JP 10-219733 A 8/1998
(Continued)

OTHER PUBLICATIONS

The International Search Report for the corresponding international application No. PCT/JP2014/081055, issued on Feb. 24, 2015.
(Continued)

*Primary Examiner* — Ian Jen
(74) *Attorney, Agent, or Firm* — Global IP Counselors, LLP

(57) ABSTRACT

A required traction force determining part is configured to determine a required traction force corresponding to an output rotational speed based on a required traction force characteristic. A command torque determining part is configured to determine a command torque to be transmitted to a motor to obtain the required traction force. An opposite movement determining part is configured to determine that a vehicle is oppositely moving when a vehicle speed becomes a predetermined speed threshold or greater in a
(Continued)

direction opposite to a moving direction corresponding to a position of a forward/rearward movement operating member. A traction force assisting part is configured to perform a traction force assisting control when it is determined that the vehicle is oppositely moving. The traction force assisting part is configured to increase the required traction force in the moving direction corresponding to the position of the forward/rearward movement operating member.

12 Claims, 8 Drawing Sheets

(51) Int. Cl.
*B60W 10/08* (2006.01)
*B60W 20/00* (2016.01)
*B60K 6/387* (2007.10)
*E02F 9/20* (2006.01)
*E02F 9/22* (2006.01)
*B60K 6/54* (2007.10)
*B60W 10/10* (2012.01)
*F16H 61/02* (2006.01)
*F16H 61/66* (2006.01)
*F16H 63/50* (2006.01)
*B60K 6/38* (2007.10)

(52) U.S. Cl.
CPC ............. *B60W 10/08* (2013.01); *B60W 10/10* (2013.01); *B60W 20/00* (2013.01); *B60W 30/18045* (2013.01); *E02F 9/202* (2013.01); *E02F 9/2037* (2013.01); *E02F 9/2058* (2013.01); *E02F 9/2079* (2013.01); *E02F 9/2253* (2013.01); *E02F 9/2292* (2013.01); *E02F 9/2296* (2013.01); *F16H 61/02* (2013.01); *F16H 61/66* (2013.01); *F16H 63/50* (2013.01); *B60K 2006/381* (2013.01); *B60W 2510/0604* (2013.01); *B60W 2510/106* (2013.01); *B60W 2520/00* (2013.01); *B60W 2520/06* (2013.01); *B60W 2540/10* (2013.01); *B60W 2540/16* (2013.01); *B60W 2710/081* (2013.01); *B60W 2710/083* (2013.01); *B60Y 2200/415* (2013.01); *Y02T 10/6239* (2013.01)

(56) References Cited

U.S. PATENT DOCUMENTS

2005/0257968 A1* 11/2005 Egami .................... B60K 6/365
   180/65.285
2011/0092334 A1   4/2011 Baino et al.
2014/0213404 A1   7/2014 Schindler et al.

FOREIGN PATENT DOCUMENTS

| JP | 2006-329244 A | 12/2006 |
| JP | 2008-154307 A | 7/2008 |
| JP | 2008-196536 A | 8/2008 |
| JP | 2012-18962 A | 9/2012 |

OTHER PUBLICATIONS

The European search report for the corresponding European application No. 14860706.2, dated on Sep. 23, 2016.

* cited by examiner

WORK VEHICLE AND CONTROL METHOD THEREOF

CROSS-REFERENCE TO RELATED APPLICATIONS

This application is a U.S. National stage application of International Application No. PCT/JP2014/081055, filed on Nov. 25, 2014. This U.S. National stage application claims priority under 35 U.S.C. §119(a) to Japanese Patent Application No. 2013-257968, filed in Japan on Dec. 13, 2013, the entire contents of which are hereby incorporated herein by reference.

BACKGROUND

Field of the Invention

The present invention relates to a work vehicle, particularly to a hybrid type work vehicle and a control method thereof.

Background Information

Among work vehicles, such as a wheel loader, a type of work vehicle equipped with a power transmission device including a torque converter and a multistage gearbox (hereinafter referred to as "a torque converter type transmission device") has been heretofore known. On the other hand, in recent years, a hybrid type work vehicle configured to travel by a driving force from an engine and that from a motor has been proposed as a type of work vehicle equipped with a type of power transmission device replacing the torque converter type transmission device. For example, Japan Laid-open Patent Application Publication No. 2006-329244 discloses an HMT (hydraulic-mechanical transmission) or an EMT (electro-mechanical transmission) as the power transmission device for the hybrid type work vehicle.

The HMT includes a planetary gear mechanism and both of a first pump/motor and a second pump/motor that are connected to rotary elements of the planetary gear mechanism. Each of the first pump/motor and the second pump/motor is configured to function as either a hydraulic motor or a hydraulic pump in accordance with a travelling condition of the work vehicle. The HMT is configured to be capable of seamlessly changing the rotational speed of an output shaft by changing the rotational speeds of the pumps/motors.

The EMT uses electric motors instead of the hydraulic motors used in the HMT. Specifically, the EMT includes a first generator/motor and a second generator/motor. Each of the first generator/motor and the second generator/motor is configured to function as either an electric motor or a generator in accordance with a travelling condition of the work vehicle. Similarly to the HMT, the EMT is configured to be capable of seamlessly changing the rotational speed of an output shaft by changing the rotational speeds of the generators/motors.

SUMMARY

The work vehicle includes a forward/rearward movement operating member, and the forward movement and the rearward movement of the work vehicle is configured to be switched when an operator switches the position of the forward/rearward movement operating member between a forward movement position and a rearward movement position. Put differently, the work vehicle is configured to move forward when the forward/rearward movement operating member is located in the forward movement position, and is configured to move rearward when the forward/rearward movement operating member is located in the rearward movement position.

However, when the operator releases an accelerator pedal while the work vehicle is moving up a hill or when the operator moves the foot pressing down a brake pedal to the accelerator pedal while the work vehicle stops on a hill, a situation could be caused that the work vehicle moves oppositely to a moving direction corresponding to the position of the forward/rearward movement operating member (the situation will be hereinafter referred to as "opposite movement").

In the aforementioned hybrid type work vehicle, when the output shaft of the power transmission device is rotated by the opposite movement, the rotation is transmitted to the motor. Thus, when the work vehicle oppositely moves at a predetermined speed or greater, there is a possibility that over-rotation of the motor is caused and the motor is thereby damaged.

On the other hand, such opposite movement can be prevented when the operator appropriately performs an acceleration operation and a brake operation. However, such appropriate operations require sophisticated skills and are not necessarily easy for all operators.

It is an object of the present invention to provide a work vehicle and a control method thereof, whereby over-rotation of a motor attributed to opposite movement can be easily prevented.

Solution to Problems

A work vehicle according to an aspect of the present invention includes an engine, a hydraulic pump, a work implement, a travel device, a power transmission device, a control unit, a forward/rearward movement operating member, an accelerator operating member, an accelerator operation detecting part and a vehicle speed detecting part. The hydraulic pump is configured to be driven by the engine. The work implement is configured to be driven by a hydraulic fluid discharged from the hydraulic pump. The travel device is configured to be driven by the engine. The power transmission device is configured to transmit a driving force from the engine to the travel device.

The control unit is configured to control the power transmission device. The forward/rearward movement operating member is a member for switching between forward movement and rearward movement of the vehicle, and is configured to be selectively switched at least between a forward movement position and a rearward movement position. The accelerator operation detecting part is configured to detect an operating amount of the accelerator operating member. The vehicle speed detecting part is configured to detect a vehicle speed.

The power transmission device includes an input shaft, an output shaft, a gear mechanism and a motor. The gear mechanism has a planetary gear mechanism and is configured to transmit a rotation of the input shaft to the output shaft. The motor is connected to a rotary element of the planetary gear mechanism. The power transmission device is configured to change a rotational speed ratio of the output shaft to the input shaft by changing a rotational speed of the motor.

The control unit includes a storage part, a required traction force determining part, a motor command determining part, an opposite movement determining part and a traction force assisting part. The storage part stores a required traction force characteristic. The required traction force characteristic defines a relation between a required traction force and an output rotational speed. The output rotational speed is a rotational speed of the output shaft of the power transmission device. The required traction force characteristic is set such that the required traction force increases with an increase in the operating amount of the accelerator operating member. The required traction force determining part is configured to determine the required traction force corresponding to the output rotational speed based on the required traction force characteristic. The motor command determining part is configured to determine a command torque to be transmitted to the motor to obtain the required traction force. The opposite movement determining part is configured to determine that the vehicle is oppositely moving when the vehicle speed becomes a predetermined speed threshold or greater in a direction opposite to a moving direction corresponding to a position of the forward/rearward movement operating member. The traction force assisting part is configured to perform a traction force assisting control when it is determined that the vehicle is oppositely moving. In the traction force assisting control, the traction force assisting part is configured to increase the required traction force in the moving direction corresponding to the position of the forward/rearward movement operating member.

When oppositely moving at a vehicle speed of the predetermined speed threshold or greater, the work vehicle according to the present aspect is configured to increase the required traction force by the traction force assisting control. Accordingly, the vehicle speed attributed to opposite movement is automatically reduced, and over-rotation of the motor attributed to opposite movement can be easily prevented.

Preferably, the motor is a first motor to be connected to a first rotary element of the planetary gear mechanism. The power transmission device further includes a second motor to be connected to a second rotary element of the planetary gear mechanism. A rotational speed of the second motor is configured to be greater than the rotational speed of the first motor when the vehicle speed is 0. Additionally, the rotational speed of the second motor is configured to increase with an increase in the vehicle speed in the opposite direction when the vehicle is oppositely moving. The motor command determining part is configured to determine the command torque to be transmitted to the first motor and a command torque to be transmitted to the second motor to obtain the required traction force. In this case, a part of energy regenerated in the first motor can be consumed in the second motor, whereas another part of the energy can be returned to the engine. Accordingly, the engine can be enhanced in fuel consumption efficiency.

Preferably, the work vehicle further includes an assistive motor, a motor switch mechanism and a tilt angle detecting part. The assistive motor is a motor for assisting the motor. The motor switch mechanism is a mechanism for switching between a state of assisting the motor by the assistive motor and a state of not assisting the motor by the assistive motor. The tilt angle detecting part is configured to detect a tilt angle of the vehicle. The control unit further includes a motor assistance determining part and a motor switch controlling part. The motor assistance determining part is configured to determine whether or not the tilt angle of the vehicle is greater than or equal to a predetermined angular threshold. The motor switch controlling part is configured to perform a control of causing the motor switch mechanism to switch into the state of assisting the motor by the assistive motor when the tilt angle of the vehicle is greater than or equal to the predetermined angular threshold.

In this case, the assistive motor is configured to assist the first motor when the work vehicle oppositely moves on a steep slope. Therefore, a traction force for inhibiting opposite movement can be quickly generated on the steep slope.

Preferably, in the traction force assisting control, the traction force assisting part is configured to increase the required traction force with increase in the vehicle speed in the opposite direction. In this case, opposite movement can be quickly inhibited by generating a larger traction force with an increase in speed of the opposite movement.

Preferably, when the vehicle speed in the opposite direction is within a predetermined speed range since starting of the traction force assisting control, the required traction force is configured to be more gently increased than when the vehicle speed in the opposite direction has been greater than the predetermined speed range. In this case, a large variation in traction force can be inhibited in starting of the traction force assisting control. Accordingly, occurrence of shock in the work vehicle can be inhibited.

Preferably, the opposite movement determining part is configured to determine that the vehicle is oppositely moving when the position of the forward/rearward movement operating member is the forward movement position and the vehicle speed in a rearward direction becomes the predetermined speed threshold or greater. In this case, opposite movement in the rearward direction can be easily inhibited.

Preferably, the opposite movement determining part is configured to determine that the vehicle is oppositely moving when the position of the forward/rearward movement operating member is the rearward movement position and the vehicle speed in a forward direction becomes the predetermined speed threshold or greater. In this case, opposite movement in the forward direction can be easily inhibited.

A method of controlling a work vehicle according to another aspect of the present invention is a method of controlling a work vehicle including an engine, a hydraulic pump, a work implement, a travel device, a power transmission device, a forward/rearward movement operating member, an accelerator operating member, an accelerator operation detecting part and a vehicle speed detecting part. The hydraulic pump is configured to be driven by the engine. The work implement is configured to be driven by a hydraulic fluid discharged from the hydraulic pump. The travel device is configured to be driven by the engine. The power transmission device is configured to transmit a driving force from the engine to the travel device.

The forward/rearward movement operating member is a member for switching between forward movement and rearward movement of the vehicle, and is configured to be selectively switched at least between a forward movement position and a rearward movement position. The accelerator operation detecting part is configured to detect an operating amount of the accelerator operating member. The vehicle speed detecting part is configured to detect a vehicle speed.

The power transmission device includes an input shaft, an output shaft, a gear mechanism and a motor. The gear mechanism has a planetary gear mechanism and is configured to transmit a rotation of the input shaft to the output shaft. The motor is connected to a rotary element of the planetary gear mechanism. The power transmission device is configured to change a rotational speed ratio of the output shaft to the input shaft by changing a rotational speed of the motor.

The control method according to the present aspect includes a first step, a second step, a third step and a fourth step. In the first step, a required traction force corresponding to an output rotational speed is determined based on a required traction force characteristic. The required traction force characteristic defines a relation between the required traction force and the output rotational speed. The output rotational speed is a rotational speed of the output shaft of the power transmission device. The required traction force characteristic is set such that the required traction force increases with increase in the operating amount of the accelerator operating member. In the second step, a command torque to be transmitted to the motor is determined to obtain the required traction force. In the third step, it is determined that the vehicle is oppositely moving when the vehicle speed becomes a predetermined speed threshold or greater in a direction opposite to a moving direction corresponding to a position of the forward/rearward movement operating member. In the fourth step, a traction force assisting control is performed when it is determined that the vehicle is oppositely moving. In the traction force assisting control, the required traction force is increased in the moving direction corresponding to the position of the forward/rearward movement operating member.

In the method of controlling the work vehicle according to the present aspect, when the work vehicle oppositely moves at a vehicle speed of the predetermined speed threshold or greater, the required traction force is increased by the traction force assisting control. Accordingly, the vehicle speed attributed to opposite movement is automatically reduced, and over-rotation of the motor attributed to opposite movement can be easily prevented.

Advantageous Effects of Invention

In the work vehicle, over-rotation of the motor attributed to opposite movement can be easily prevented.

DETAILED DESCRIPTION OF EXEMPLARY EMBODIMENTS

Figure 1:
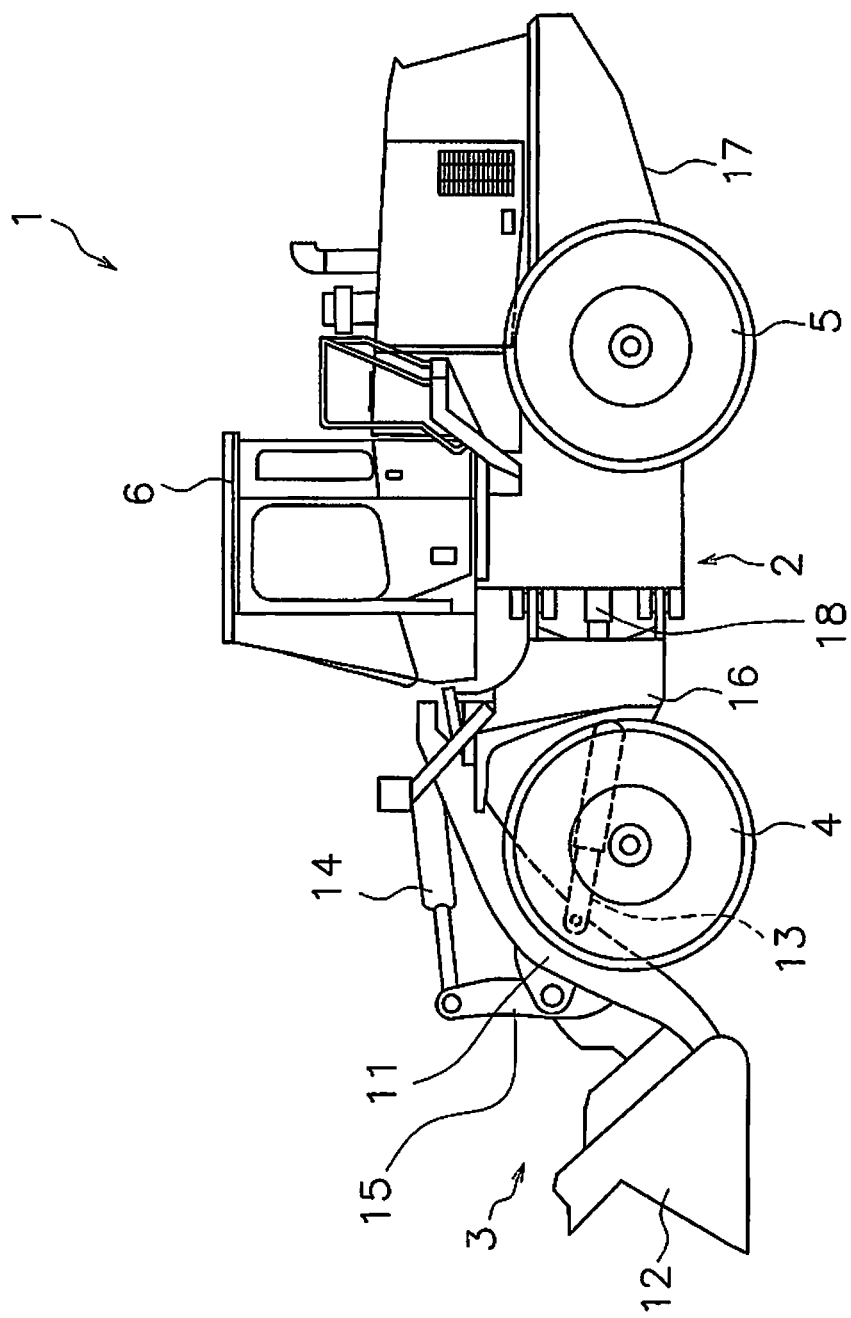
FIG. 1 is a side view of a work vehicle according to an exemplary embodiment of the present invention.

An exemplary embodiment of the present invention will be hereinafter explained with reference to drawings. FIG. 1 is a side view of a work vehicle 1 according to the exemplary embodiment of the present invention. As shown in FIG. 1, the work vehicle 1 includes a vehicle body frame 2, a work implement 3, travelling wheels 4 and 5, and a cab 6. The work vehicle 1 is a wheel loader and is configured to travel when the travelling wheels 4 and 5 are driven and rotated. The work vehicle 1 is capable of performing work, such as digging, with use of the work implement 3.

The work implement 3 and the travelling wheels 4 and 5 are attached to the vehicle body frame 2. The work implement 3 is driven by hydraulic fluid from a work implement pump 23 to be described (see FIG. 2). The work implement 3 includes a boom 11 and a bucket 12. The boom 11 is mounted to the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. When the lift cylinder 13 is extended and contracted by the hydraulic fluid from the work implement pump 23, the boom 11 is configured to pivot up and down. The bucket 12 is attached to the tip end of the boom 11. One end of the bucket cylinder 14 is attached to the vehicle body frame 2. The other end of the bucket cylinder 14 is attached to the bucket 12 through a bellcrank 15. When the bucket cylinder 14 is extended and contracted by the hydraulic fluid from the work implement pump 23, the bucket 12 is configured to pivot up and down.

The cab 6 is attached to the vehicle body frame 2. The cab 6 is mounted onto the vehicle body frame 2. A seat on which an operator is seated, an operating device to be described, and so forth are disposed within the cab 6. The vehicle body frame 2 includes a front frame 16 and a rear frame 17. The front frame 16 and the rear frame 17 are attached to each other to be capable of pivoting in the right-and-left direction.

The work vehicle 1 includes a steering cylinder 18. The steering cylinder 18 is attached to the front frame 16 and the rear frame 17. The steering cylinder 18 is a hydraulic cylinder. When the steering cylinder 18 is extended and contracted by the hydraulic fluid from a steering pump 30 to be described, the moving direction of the work vehicle 1 is configured to be changed right and left.

Figure 2:
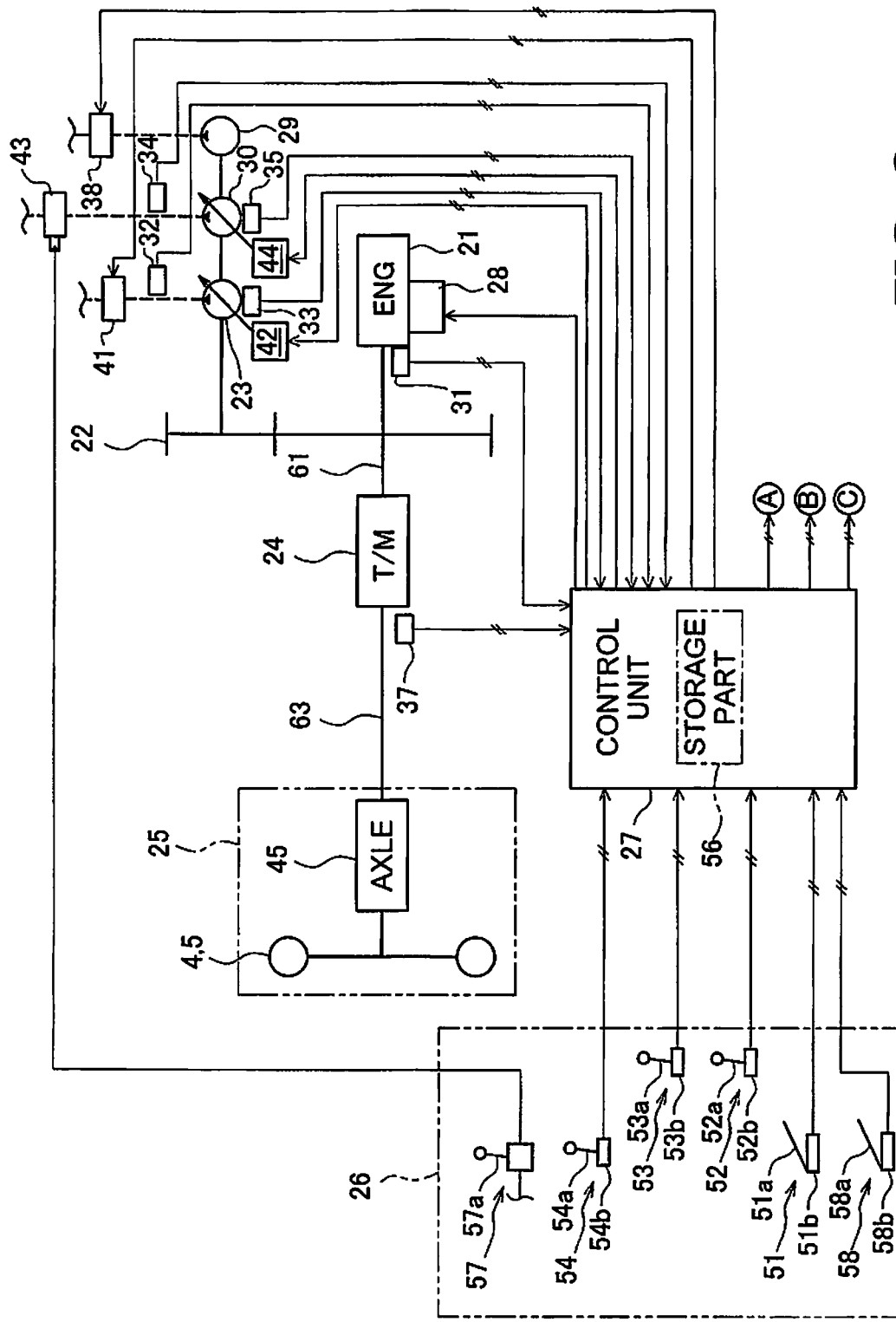
FIG. 2 is a schematic diagram of a construction of the work vehicle.

FIG. 2 is a schematic diagram of a construction of the work vehicle 1. As shown in FIG. 2, the work vehicle 1 includes an engine 21, a power take-off device (PTO) 22, a power transmission device 24, a travel device 25, an operating device 26, a control unit 27 and so forth.

The engine 21 is, for instance, a diesel engine. The output of the engine 21 is controlled by regulating the amount of fuel to be injected into the cylinder of the engine 21. The amount of fuel is regulated through the control of a fuel injection device 28 attached to the engine 21 by the control unit 27. The work vehicle 1 includes an engine rotational speed detecting part 31. The engine rotational speed detecting part 31 is configured to detect an engine rotational speed and transmit a detection signal indicating the engine rotational speed to the control unit 27.

The work vehicle 1 includes the work implement pump 23, the steering pump 30 and a transmission pump 29. The work implement pump 23, the steering pump 30 and the transmission pump 29 are hydraulic pumps. The PTO 22 is configured to transmit part of a driving force from the engine 21 to these hydraulic pumps 23, 30 and 29. Put differently, the PTO 22 is configured to distribute the driving force from the engine 21 to these hydraulic pumps 23, 30 and 29 and to the power transmission device 24.

The work implement pump 23 is driven by the driving force form the engine 21. The hydraulic fluid discharged from the work implement pump 23 is supplied to the aforementioned lift cylinder 13 and bucket cylinder 14 through a work implement control valve 41. The work vehicle 1 includes a work implement pump pressure detecting part 32. The work implement pump pressure detecting part 32 is configured to detect the discharge pressure of the hydraulic fluid from the work implement pump 23 (hereinafter referred to as "a work implement pump pressure") and transmit a detection signal indicating the work implement pump pressure to the control unit 27.

The work implement pump 23 is a variable displacement hydraulic pump. The discharge volume of the work implement pump 23 is changed by changing the tilt angle of either a swashplate or a tilting shaft of the work implement pump 23. A first displacement control device 42 is connected to the work implement pump 23. The first displacement control device 42 is controlled by the control unit 27 and is configured to change the tilt angle of the work implement pump 23. Accordingly, the discharge volume of the work implement pump 23 is controlled by the control unit 27. The work vehicle 1 includes a first tilt angle detecting part 33. The first tilt angle detecting part 33 is configured to detect the tilt angle of the work implement pump 23 and transmit a detection signal indicating the tilt angle to the control unit 27.

The steering pump 30 is driven by the driving force from the engine 21. The hydraulic fluid discharged from the steering pump 30 is supplied to the aforementioned steering cylinder 18 through a steering control valve 43. The work vehicle 1 includes a steering pump pressure detecting part 34. The steering pump pressure detecting part 34 is configured to detect the discharge pressure of the hydraulic fluid from the steering pump 30 (hereinafter referred to as "a steering pump pressure") and transmit a detection signal indicating the steering pump pressure to the control unit 27.

The steering pump 30 is a variable displacement hydraulic pump. The discharge volume of the steering pump 30 is changed by changing the tilt angle of either a swashplate or a tilting shaft of the steering pump 30. A second displacement control device 44 is connected to the steering pump 30. The second displacement control device 44 is controlled by the control unit 27 and is configured to change the tilt angle of the steering pump 30. Accordingly, the discharge volume of the steering pump 30 is controlled by the control unit 27. The work vehicle 1 includes a second tilt angle detecting part 35. The second tilt angle detecting part 35 is configured to detect the tilt angle of the steering pump 30 and transmit a detection signal indicating the tilt angle to the control unit 27.

The transmission pump 29 is driven by the driving force from the engine 21. The transmission pump 29 is a fixed displacement hydraulic pump. The hydraulic fluid discharged from the transmission pump 29 is supplied to clutches CF, CR, CL, CH, Cm1 and Cm2 (to be described) of the power transmission device 24 through a clutch control valve 38.

The PTO 22 is configured to transmit part of the driving force from the engine 21 to the power transmission device 24. The power transmission device 24 is configured to transmit the driving force from the engine 21 to the travel device 25. The power transmission device 24 is configured to change the speed of the driving force from the engine 21 and output the speed-changed driving force. The construction of the power transmission device 24 will be explained below in detail.

The travel device 25 includes an axle 45 and the travelling wheels 4 and 5. The axle 45 is configured to transmit the driving force from the power transmission device 24 to the travelling wheels 4 and 5. The travelling wheels 4 and 5 are thereby rotated. The work vehicle 1 includes a vehicle speed detecting part 37. The vehicle speed detecting part 37 is configured to detect the rotational speed of an output shaft 63 of the power transmission device 24 (hereinafter referred to as "an output rotational speed"). The output rotational speed corresponds to the vehicle speed. Hence, the vehicle speed detecting part 37 is configured to detect the vehicle speed by detecting the output rotational speed. Additionally, the vehicle speed detecting part 37 is configured to detect the rotational direction of the output shaft 63. The rotational direction of the output shaft 63 corresponds to the moving direction of the work vehicle 1. Hence, the vehicle speed detecting part 37 functions as a moving direction detecting part for detecting the moving direction of the work vehicle 1 by detecting the rotational direction of the output shaft 63. The vehicle speed detecting part 37 is configured to transmit a detection signal indicating the output rotational speed and the rotational direction to the control unit 27.

The operating device 26 is operated by the operator. The operating device 26 includes an accelerator operating device 51, a work implement operating device 52, a gearshift operating device 53, a forward/rearward movement operating device 54 (hereinafter referred to as "an FR operating device 54"), a steering operating device 57 and a brake operating device 58.

The accelerator operating device 51 includes an accelerator operating member 51a and an accelerator operation detecting part 51b. The accelerator operating member 51a is operated for setting a target rotational speed of the engine 21. The accelerator operation detecting part 51b is configured to detect the operating amount of the accelerator operating member 51a (hereinafter referred to as "an accelerator operating amount"). The accelerator operation detecting part 51b is configured to transmit a detection signal indicating the accelerator operating amount to the control unit 27.

The work implement operating device 52 includes a work implement operating member 52a and a work implement operation detecting part 52b. The work implement operating member 52a is operated for causing the work implement 3 to perform an action. The work implement operation detecting part 52b is configured to detect the position of the work implement operating member 52a. The work implement operation detecting part 52b is configured to output a detection signal indicating the position of the work implement operating member 52a to the control unit 27. The work implement operation detecting part 52b is configured to detect the operating amount of the work implement operating member 52a by detecting the position of the work implement operating member 52a.

The gearshift operating device 53 includes a gearshift operating member 53a and a gearshift operation detecting part 53b. The gearshift operating member 53a is a member for selecting one of the speed ranges, in each of which the upper limit of the vehicle speed is set. The operator is capable of selecting one of the speed ranges of the power transmission device 24 by operating the gearshift operating member 53a. The gearshift operation detecting part 53b is configured to detect the position of the gearshift operating member 53a. The positions of the gearshift operating member 53a respectively correspond to a plurality of speed ranges including, for instance, a first gear stage, a second gear stage and so forth. The gearshift operation detecting part 53b is configured to output a detection signal indicating the position of the gearshift operating member 53a to the control unit 27.

The FR operating device 54 includes a forward/rearward movement operating member 54a (hereinafter referred to as "an FR operating member 54a") and a forward/rearward movement position detecting part 54b (hereinafter referred to as "an FR position detecting part 54b"). The operator is capable of switching between forward movement and rearward movement of the work vehicle 1 by operating the FR operating member 54a. The FR operating member 54a is selectively switched among a forward movement position (F), a neutral position (N) and a rearward movement position (R). The FR position detecting part 54b is configured to detect the position of the FR operating member 54a. The FR position detecting part 54b is configured to output a detection signal indicating the position of the FR operating member 54a to the control unit 27.

The steering operating device 57 includes a steering operating member 57a. The steering operating device 57 is configured to drive the steering control valve 43 by supplying a pilot hydraulic pressure to the steering control valve 43 in response to an operation of the steering operating member 57a. It should be noted that the steering operating device 57 may be configured to drive the steering control valve 43 by converting the operation of the steering operating member 57a into an electric signal. The operator is capable of changing the moving direction of the work vehicle 1 right and left by operating the steering operating member 57a.

The brake operating device 58 includes a brake operating member 58a and a brake operation detecting part 58b. The operator is capable of manipulating the deceleration force of the work vehicle 1 by operating the brake operating member 58a. The brake operation detecting part 58b is configured to detect the operating amount of the brake operating member 58a (hereinafter referred to as "a brake operating amount"). The brake operation detecting part 58b is configured to output a detection signal indicating the brake operating amount to the control unit 27. It should be noted that the pressure of brake oil may be used as the brake operating amount.

The control unit 27 includes an arithmetic logic unit, such as a CPU, and memories, such as a RAM and a ROM, and is configured to perform processing for controlling the work vehicle 1. Additionally, the control unit 27 includes a storage part 56. The storage part 56 stores programs and data for controlling the work vehicle 1.

The control unit 27 is configured to transmit a command signal indicating a command throttle value to the fuel injection device 28 such that the target rotational speed of the engine 21 can be achieved in accordance with the accelerator operating amount. Controlling of the engine 21 by the control unit 27 will be explained below in detail.

The control unit 27 is configured to control the hydraulic pressures to be supplied to the hydraulic cylinders 13 and 14 by controlling the work implement control valve 41 on the basis of the detection signal from the work implement operation detecting part 52b. Accordingly, the hydraulic cylinders 13 and 14 are extended and contracted, and the work implement 3 performs an action.

Additionally, the control unit 27 is configured to control the power transmission device 24 on the basis of the detection signals from the respective detecting parts. Controlling of the power transmission device 24 by the control unit 27 will be explained below in detail.

Figure 3:
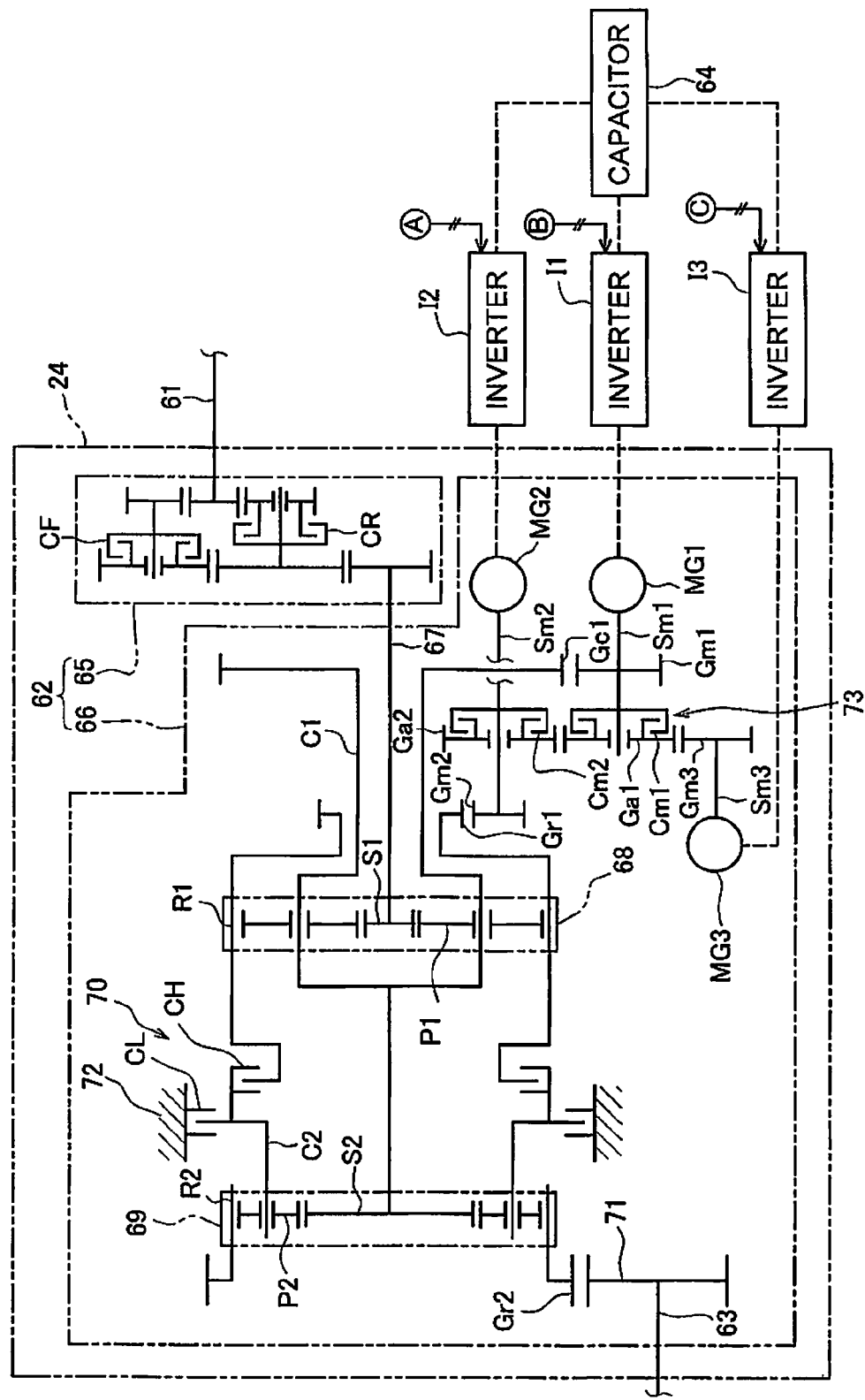
FIG. 3 is a schematic diagram of a construction of a power transmission device.

Next, the construction of the power transmission device 24 will be explained in detail. FIG. 3 is a schematic diagram showing the construction of the power transmission device 24. As shown in FIG. 3, the power transmission device 24 includes an input shaft 61, a gear mechanism 62, the output shaft 63, a first motor MG1, a second motor MG2, a third motor MG3 and a capacitor 64. The input shaft 61 is connected to the aforementioned PTO 22. Rotation from the engine 21 is inputted into the input shaft 61 through the PTO 22. The gear mechanism 62 is configured to transmit the rotation of the input shaft 61 to the output shaft 63. The output shaft 63 is connected to the aforementioned travel device 25, and is configured to transmit the rotation from the gear mechanism 62 to the aforementioned travel device 25.

The gear mechanism 62 is a mechanism configured to transmit a driving force from the engine 21. The gear mechanism 62 is configured to change a rotational speed ratio of the output shaft 63 to the input shaft 61 in accordance with variation in rotational speed of the motors MG1, MG2 and MG3. The gear mechanism 62 includes an FR switch mechanism 65 and a gearshift mechanism 66.

The FR switch mechanism 65 includes a forward movement clutch CF (hereinafter referred to as "an F clutch CF"), a rearward movement clutch CR (hereinafter referred to as "an R clutch CR"), and a variety of gears not shown in the drawing. The F clutch CF and the R clutch CR are hydraulic clutches, and the hydraulic fluid is supplied to the respective clutches CF and CR from the transmission pump 29. The hydraulic fluid to be supplied to the F clutch CF is controlled by the clutch control valve 38 shown in FIG. 2. The hydraulic fluid to be supplied to the R clutch CR is controlled by the clutch control valve 38. The clutch control valve 38 is controlled by a command signal from the control unit 27.

The direction of the rotation to be outputted from the FR switch mechanism 65 is configured to be switched when connection/disconnection of the F clutch CF and connection/disconnection of the R clutch CR are switched. When described in detail, in forward movement of the vehicle, the F clutch CF is configured to be connected whereas the R clutch CR is configured to be disconnected. In rearward movement of the vehicle, the F clutch CF is configured to be disconnected whereas the R clutch CR is configured to be connected.

The gearshift mechanism 66 includes a transmission shaft 67, a first planetary gear mechanism 68, a second planetary gear mechanism 69, a Hi/Lo switch mechanism 70 and an output gear 71. The transmission shaft 67 is coupled to the FR switch mechanism 65. The first planetary gear mechanism 68 and the second planetary gear mechanism 69 are disposed coaxially to the transmission shaft 67.

The first planetary gear mechanism 68 includes a first sun gear S1, a plurality of first planet gears P1, a first carrier C1 supporting the plurality of first planet gears P1, and a first ring gear R1. The first sun gear S1 is coupled to the transmission shaft 67. The plurality of first planet gears P1 are engaged with the first sun gear S1 and are rotatably supported by the first carrier C1. The first carrier C1 has a first carrier gear Gc1 on the outer peripheral part thereof. The first ring gear R1 is meshed with the plural first planet gears P1 and is also rotatable. Additionally, the first ring gear R1 has a first ring outer peripheral gear Gr1 on the outer periphery thereof.

The second planetary gear mechanism 69 includes a second sun gear S2, a plurality of second planet gears P2, a second carrier C2 supporting the plurality of second planet gears P2, and a second ring gear R2. The second sun gear S2 is coupled to the first carrier C1. The plurality of second planet gears P2 are meshed with the second sun gear S2 and are rotatably supported by the second carrier C2. The second ring gear R2 is meshed with the plurality of second planet gears P2 and is also rotatable. The second ring gear R2 has a second ring outer peripheral gear Gr2 on the outer periphery thereof. The second ring outer peripheral gear Gr2 is meshed with the output gear 71, and the rotation of the second ring gear R2 is outputted to the output shaft 63 through the output gear 71.

The Hi/Lo switch mechanism 70 is a mechanism for switching a driving force transmission path in the power transmission device 24 between a high mode (a Hi mode) in which the vehicle speed is high and a low mode (a Lo mode) in which the vehicle speed is low. The Hi/Lo switch mechanism 70 includes an H clutch CH configured to be engaged in the Hi mode and an L clutch CL configured to be engaged in the Lo mode. The H clutch CH is configured to connect or disconnect the first ring gear R1 and the second carrier C2. On the other hand, the L clutch CL is configured to connect or disconnect the second carrier C2 and a fixed end 72, and is thus configured to prevent or allow the rotation of the second carrier C2.

It should be noted that the respective clutches CH and CL are hydraulic clutches, and the hydraulic fluid is supplied to the respective clutches CH and CL separately from the transmission pump 29. The hydraulic fluid to be supplied to the H clutch CH is controlled by the clutch control valve 38. The hydraulic fluid to be supplied to the L clutch CL is controlled by the clutch control valve 38.

The first motor MG1 and the second motor MG2 function as drive motors configured to generate a driving force by electric energy. Additionally, the first motor MG1 and the second motor MG2 also function as generators configured to generate electric energy with use of a driving force to be inputted thereto. The first motor MG1 is configured to function as the generator when a command signal is given thereto from the control unit 27 such that a torque acts on the first motor MG1 in the opposite direction to the rotational direction of the first motor MG1. A first motor gear Gm1 is fixed to a rotational shaft Sm1 of the first motor MG1, and is meshed with the first carrier gear Gc1.

The second motor MG2 is constructed similarly to the first motor MG1. A second motor gear Gm2 is fixed to a rotational shaft Sm2 of the second motor MG2, and is meshed with the first ring outer peripheral gear Gr1.

The third motor MG3 assists the first motor MG1 and the second motor MG2. The third motor MG3 is constructed similarly to the first motor MG1 and the second motor MG2. The gearshift mechanism 66 includes a motor switch mechanism 73, and the motor switch mechanism 73 is configured to selectively switch between the first motor MG1 and the second motor MG2 as a target to be assisted by the third motor MG3.

When described in detail, the motor switch mechanism 73 includes a first motor clutch Cm1, a second motor clutch Cm2, a first connection gear Ga1 and a second connection gear Ga2. A third motor gear Gm3 is connected to a rotational shaft Sm3 of the third motor MG3, and is meshed with the first connection gear Ga1. The first motor clutch Cm1 is configured to switch connection and disconnection between the rotational shaft Sm1 of the first motor MG1 and the first connection gear Ga1. The first connection gear Ga1 is meshed with the second connection gear Ga2. The second motor clutch Cm2 is configured to switch connection and disconnection between the rotational shaft Sm2 of the second motor MG2 and the second connection gear Ga2.

The first motor clutch Cm1 and the second motor clutch Cm2 are hydraulic clutches. The hydraulic fluid is supplied to each motor clutch Cm1, Cm2 from the transmission pump 29. The hydraulic fluid to be supplied to each motor clutch Cm1, Cm2 is controlled by the clutch control valve 38.

The motor switch mechanism 73 is capable of switching the third motor MG3 among a first connected state, a second connected state and a disconnected state. In the first connected state, the first motor clutch Cm1 is configured to be connected, and simultaneously, the second motor clutch Cm2 is configured to be disconnected. Put differently, in the first connected state, the third motor MG3 is configured to be connected to the first motor MG1 and assist the first motor MG1. In the second connected state, the second motor clutch Cm2 is configured to be connected, and simultaneously, the first motor clutch Cm1 is configured to be disconnected. Put differently, in the second connected state, the third motor MG3 is configured to be connected to the second motor MG2 and assist the second motor MG2. In the disconnected state, the first motor clutch Cm1 and the second motor clutch Cm2 are configured to be disconnected. Put differently, in the disconnected state, the third motor MG3 is configured to be disconnected from any of the first motor MG1 and the second motor MG2 and not to assist any of the first motor MG1 and the second motor MG2.

The first motor MG1 is connected to the capacitor 64 through a first inverter I1. The second motor MG2 is connected to the capacitor 64 through a second inverter I2. The third motor MG3 is connected to the capacitor 64 through a third inverter I3.

The capacitor 64 functions as an energy storage for storing energy to be generated by the motors MG1, MG2 and MG3. Put differently, the capacitor 64 is configured to charge electric power generated by the respective motors MG1, MG2 and MG3 when the total amount of electric power generated by the respective motors MG1 and MG2 is large. Contrarily, the capacitor 64 is configured to discharge electric power when the total amount of electric power consumed by the respective motors MG1, MG2 and MG3 is large. Put differently, the respective motors MG1, MG2 and MG3 are driven by electric power stored in the capacitor 64. It should be noted that instead of the capacitor, a battery may be used as electric storage means. Additionally, a booster for regulating voltage may be disposed between the electric storage means and the inverters.

The control unit 27 is configured to receive detection signals from a variety of detecting parts and give command signals, which indicate command torques to be transmitted to the motors MG1, MG2 and MG3, to the respective inverters I1, I2 and I3. It should be noted that the control unit 27 may be configured to output rotational speed commands of the motors MG1, MG2 and MG3. In this case, the inverters I1, I2 and I3 are configured to calculate command torques in accordance with the rotational speed commands and control the motors MG1, MG2 and MG3. Additionally, the control unit 27 is configured to give command signals for controlling the clutch hydraulic pressures of the respective clutches CF, CR, CH, CL, Cm1 and Cm2 to the clutch control valve 38. The clutch control valve 38 includes a plurality of valves for controlling the respective clutches CF, CR, CH, CL, Cm1 and Cm2.

The motors MG1, MG2 and MG3 and the clutches CF, CR, CH, CL, Cm1 and Cm2 are controlled by the command signals from the control unit 27, and accordingly, a gear ratio and an output torque of the power transmission device 24 are controlled. An action of the power transmission 24 will be hereinafter explained.

Figure 4:
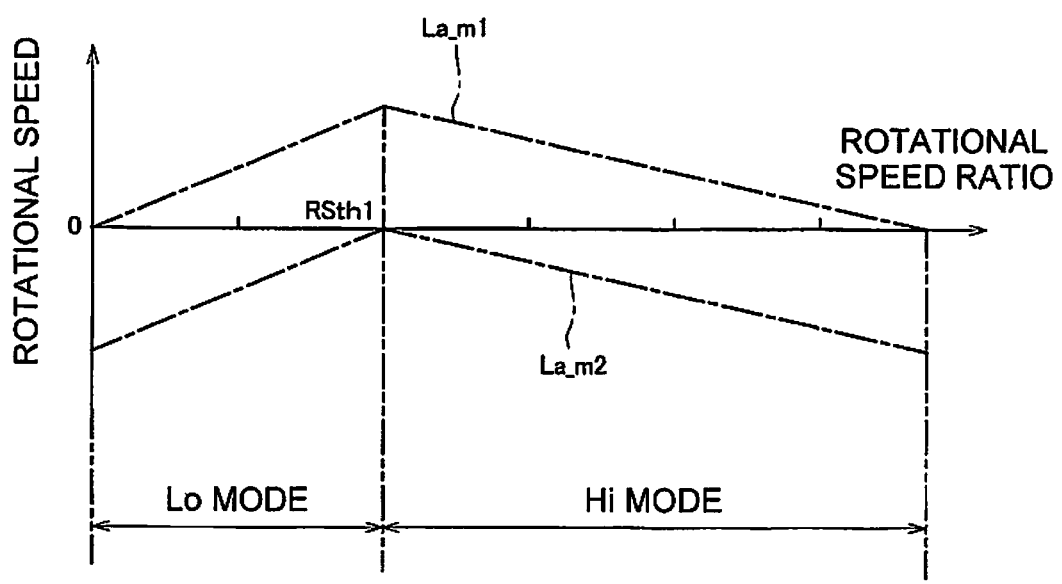
FIG. 4 is a diagram showing variation in rotational speed of a first motor and variation in rotational speed of a second motor with respect to a rotational speed ratio.

With use of FIG. 4, explanation will be herein described for a schematic action of the power transmission device 24 in a condition that the vehicle speed accelerates from 0 in the forward moving direction, with the rotational speed of the engine 21 being kept constant. FIG. 4 shows a relation between the rotational speed of each motor MG1, MG2 and the rotational speed ratio of the power transmission device 24. Where the rotational speed of the engine 21 is constant, the vehicle speed varies in accordance with the rotational speed ratio of the power transmission device 24. The rotational speed ratio is a ratio of the rotational speed of the output shaft 63 to the rotational speed of the input shaft 61. Therefore in FIG. 4, variation in rotational speed ratio of the power transmission device 24 corresponds to variation in vehicle speed. Put differently, FIG. 4 is a chart showing the rotational speed of each motor MG1, MG2 with respect to the vehicle speed. In FIG. 4, a dashed dotted line La_m1 indicates the rotational speed of the first motor MG1, whereas a dashed dotted line La_m2 indicates the rotational speed of the second motor MG2. It should be noted that instead of the rotational speed of each motor MG1, MG2, a ratio of the rotational speed of each motor MG1, MG2 to the rotational speed of the engine 21 may be set as the vertical axis in FIG. 4.

When the rotational speed ratio is a value falling in a range of 0 to a predetermined threshold RSth1, the power transmission path of the power transmission device 24 is set in the Lo mode. In the Lo mode, the L clutch CL is configured to be connected whereas the H clutch CH is configured to be disconnected. In the Lo mode, the H clutch CH is configured to be disconnected, and thus, the second carrier C2 and the first ring gear R1 are configured to be disconnected. On the other hand, the L clutch CL is configured to be connected, and thus, the second carrier C2 is configured to be fixed.

In the Lo mode, the driving force from the engine 21 is inputted into the first sun gear S1 through the transmission shaft 67, and is then outputted to the second sun gear S2 through the first carrier C1. On the other hand, the driving force inputted into the first sun gear S1 is transmitted from the first planet gears P1 to the first ring gear R1, and is then outputted to the second motor MG2 through the first ring outer peripheral gear Gr1 and the second motor gear Gm2. In the Lo mode, the second motor MG2 mainly functions as a generator, and electric power generated by the second motor MG2 is partially charged in the capacitor 64.

In the Lo mode, on the other hand, the first motor MG1 mainly functions as an electric motor. The driving force of the first motor MG1 is outputted to the second sun gear S2 through the first motor gear Gm1, the first carrier gear Gc1, and then the first carrier C1 in this sequential path. Electric power for driving the first motor MG1 is herein supplied either from the second motor MG2 or, on an as-needed basis, from the capacitor 64. The driving force outputted to the second sun gear S2 as described above is transmitted to the output shaft 63 through the second planet gears P2, the second ring gear R2, the second ring outer peripheral gear Gr2 and then the output gear 71 in this sequential path.

When the value of the rotational speed ratio exceeds RSth1, the power transmission path of the power transmission device 24 is determined to be in the Hi mode. In the Hi mode, the H clutch CH is configured to be connected whereas the L clutch CL is configured to be disconnected. In the Hi mode, the H clutch CH is configured to be connected, and thus, the second carrier C2 and the first ring gear R1 are configured to be connected. On the other hand, the L clutch CL is configured to be disconnected, and thus, the second carrier C2 is configured to be disconnected. Therefore, the rotational speed of the first ring gear R1 and that of the second carrier C2 are matched.

In the Hi mode, the driving force from the engine 21 is inputted into the first sun gear S1, and is then outputted to the second sun gear S2 through the first carrier C1. Additionally, the driving force inputted into the first sun gear S1 is outputted from the first carrier C1 to the first motor MG1 through the first carrier gear Gc1 and the first motor gear Gm1. In the Hi mode, the first motor MG1 mainly functions as a generator, and thus, electric power generated by the first motor MG1 is partially charged in the capacitor 64.

On the other hand, the driving force of the second motor MG2 is outputted to the second carrier C2 through the second motor gear Gm2, the first ring outer peripheral gear Gr1, the first ring gear R1 and then the H clutch CH in this sequential path. At this time, electric power for driving the second motor MG2 is supplied either from the first motor MG1 or, on an as needed-basis, from the capacitor 64. The driving force outputted to the second sun gear S2 as described above is outputted to the second ring gear R2 through the second planet gears P2, and simultaneously, the driving force outputted to the second carrier C2 is outputted to the second ring gear R2 through the second planet gears P2. Thus, the driving forces join in the second ring gear R2, and are transmitted to the output shaft 63 through the second ring outer peripheral gear Gr2 and the output gear 71.

It should be noted that the aforementioned explanation relates to the action to be performed in forward travel driving, but an action similar to the above will be also performed in rearward travel driving. Additionally in braking, the roles of the first motor MG1 and the second motor MG2 as a generator and a motor are configured to be reversed to the aforementioned roles.

It should be noted that the third motor MG3 is configured to assist either the first motor MG1 or the second motor MG2 in accordance with a condition of the work vehicle 1. The control unit 27 is configured to determine whether or not assistance by the third motor MG3 is required in accordance with the condition of the work vehicle 1. When determining that assistance by the third motor MG3 is required, the control unit 27 is configured to connect the third motor MG3 to either the first motor MG1 or the second motor MG2. When determining that assistance by the third motor MG3 is not required, the control unit 27 is configured to set the third motor MG3 in the disconnected state without connecting the third motor MG3 to any of the first motor MG1 and the second motor MG2.

When the third motor MG3 assists the first motor MG1, the first motor clutch Cm1 is configured to be connected whereas the second motor clutch Cm2 is configured to be disconnected. Therefore, the first connection gear Ga1 is configured to be connected to the rotational shaft Sm1 of the first motor MG1, whereas the second connection gear Ga2 is configured to be disconnected from the rotational shaft Sm2 of the second motor MG2. Thus, the third motor MG3 is configured to be connected to the first motor MG1 through the third motor gear Gm3, the first connection gear Ga1 and the first motor clutch Cm1. On the other hand, the second motor clutch Cm2 is configured to be disconnected, and thus, the third motor MG3 is configured to be disconnected from the second motor MG2.

When the third motor MG3 assists the second motor MG2, the first motor clutch Cm1 is configured to be disconnected, whereas the second motor clutch Cm2 is configured to be connected. Therefore, the second connection gear Ga2 is configured to be connected to the rotational shaft Sm2 of the second motor MG2, whereas the first connection gear Ga1 is configured to be disconnected from the rotational shaft Sm1 of the first motor MG1. Accordingly, the third motor MG3 is configured to be connected to the second motor MG2 through the third motor gear Gm3, the first connection gear Ga1, the second connection gear Ga2 and the second motor clutch Cm2. Additionally, the first motor clutch Cm1 is configured to be disconnected, and thus, the third motor MG3 is configured to be disconnected from the first motor MG1.

Next, controlling of the power transmission device 24 by the control unit 27 will be explained. The control unit 27 is configured to control the output torque of the power transmission device 24 by controlling motor torques of the first motor MG1, the second motor MG2 and the third motor MG3. Put differently, the control unit 27 is configured to control a traction force of the work vehicle 1 by controlling the motor torques of the first motor MG1, the second motor MG2 and the third motor MG3.

Figure 5:
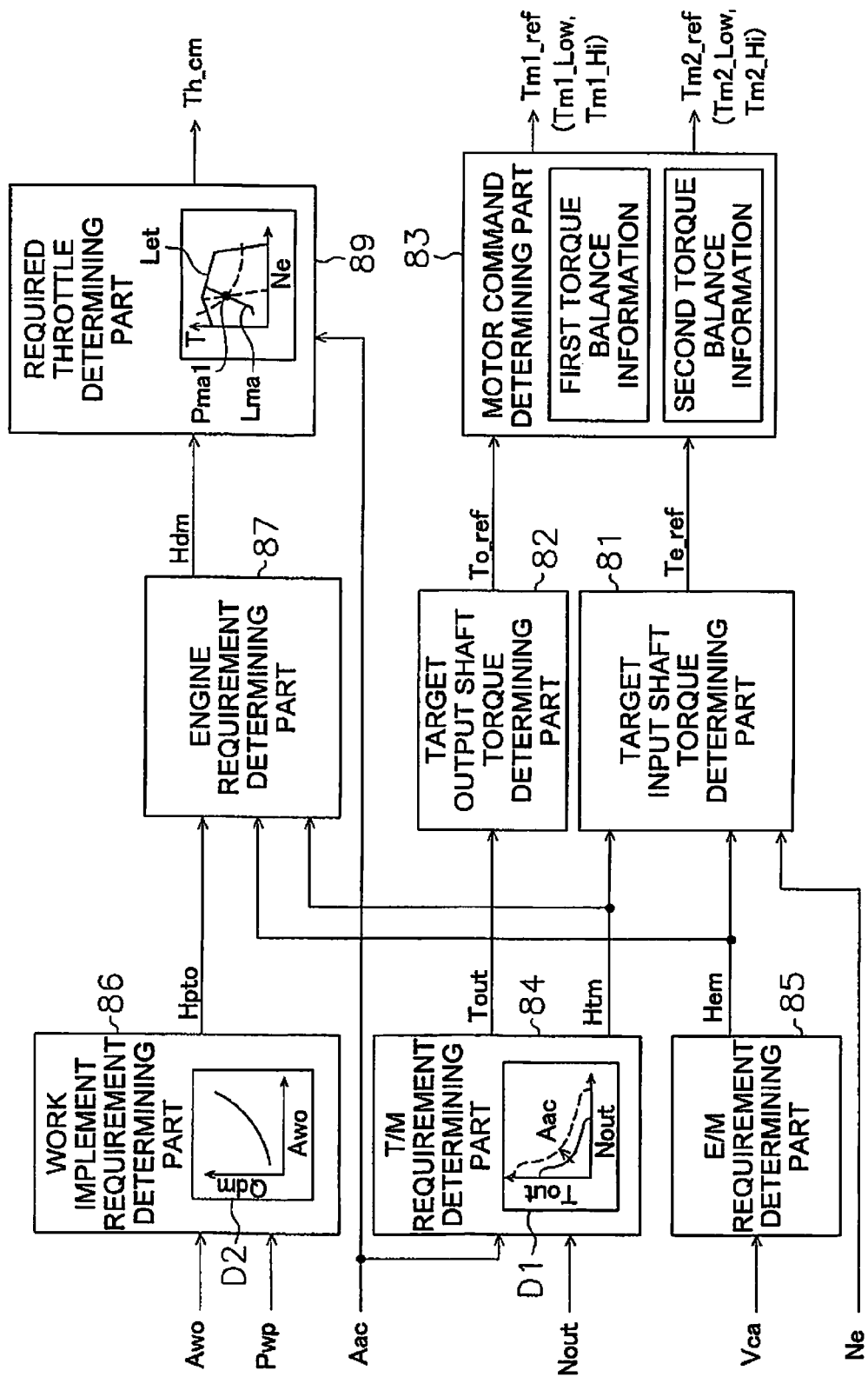
FIG. 5 is a control block diagram showing processing to be performed by a control unit.

First, a method of determining command torques to be transmitted to the first motor MG1 and the second motor MG2 will be explained. FIG. 5 is a control block diagram for showing processing to be performed by the control unit 27. As shown in FIG. 5, the control unit 27 includes a transmission requirement determining part 84, an energy management requirement determining part 85 and a work implement requirement determining part 86.

The transmission requirement determining part 84 functions as a required traction force determining part for determining a required traction force Tout on the basis of an accelerator operating amount Aac and an output rotational speed Nout. When described in detail, the transmission requirement determining part 84 is configured to determine the required traction force Tout from the output rotational speed Nout on the basis of required traction force characteristic information D1 stored in the storage part 56. The required traction force characteristic information D1 is a set of data for indicating required traction force characteristics that define a relation between the output rotational speed Nout and the required traction force Tout. Additionally, the required traction force characteristics are changed in accordance with the accelerator operating amount Aac. When described in detail, the required traction force characteristics are set such that the required traction force increases with increase in the accelerator operating amount Aac. The required traction force characteristics correspond to predetermined vehicle speed-traction force characteristics. The transmission requirement determining part 84 is configured to determine the required traction force Tout from the output rotational speed Nout with use of the required traction force characteristics in accordance with the accelerator operating amount Aac and determine a transmission required horsepower Htm by a product of the output rotational speed Nout and the required traction force Tout.

The energy management requirement determining part 85 is configured to determine an energy management required horse power Hem on the basis of the amount of electric power remaining in the capacitor 64. The energy management required horsepower Hem is a horsepower required by the power transmission device 24 for charging the capacitor 64. For example, the energy management requirement determining part 85 is configured to determine a present capacitor charged amount from a voltage Vca of the capacitor 64. The energy management requirement determining part 85 is configured to increase the energy management required horsepower Hem with reduction in the present capacitor charged amount.

The work implement requirement determining part 86 is configured to determine a work implement required horsepower Hpto on the basis of a work implement pump pressure Pwp and an operating amount Awo of the work implement operating member 52a (hereinafter referred to as "a work implement operating amount Awo"). In the present exemplary embodiment, the work implement required horsepower Hpto is a horsepower to be distributed to the work implement pump 23. It should be noted that the work implement required horsepower Hpto may include a horsepower to be distributed to the steering pump 30 and/or that to be distributed to the transmission pump 29. When described in detail, the work implement requirement determining part 86 is configured to determine a required flow rate Qdm of the work implement pump 23 from the work implement operating amount Awo on the basis of required flow rate information D2. The required flow rate information D2 is stored in the storage part 56, and defines a relation between the required flow rate Qdm and the work implement operating amount Awo. The work implement requirement determining part 86 is configured to determine the work implement required horsepower Hpto from the required flow rate Qdm and the work implement pump pressure Pwp.

The control unit 27 includes a target output shaft torque determining part 82, a target input shaft torque determining part 81 and a motor command determining part 83.

The target output shaft torque determining part 82 is configured to determine a target output shaft torque To_ref. The target output shaft torque To_ref is a target value of a torque to be outputted from the power transmission device 24. The target output shaft torque determining part 82 is configured to determine the target output shaft torque To_ref on the basis of the required traction force Tout determined by the transmission requirement determining part 84. When described in detail, the target output shaft torque To_ref is determined by multiplying the required traction force Tout by a predetermined distribution factor. For example, the predetermined distribution factor is set such that sum of the work implement required horsepower Hpto, the transmission required horsepower Htm and the energy management required horsepower Hem does not exceed the output horsepower from the engine 21.

The target input shaft torque determining part 81 is configured to determine a target input shaft torque Te_ref. The target input shaft torque Te_ref is a target value of a torque to be inputted into the power transmission device 24. The target input shaft torque determining part 81 is configured to determine the target input shaft torque Te_ref on the basis of the transmission required horsepower Htm and the energy management required horsepower Hem. When described in detail, the target input shaft torque determining part 81 is configured to calculate the target input shaft torque Te_ref by totaling a value obtained by multiplying the transmission required horsepower Htm by a predetermined distribution factor and the energy management required horsepower Hem and then by multiplying the obtained total by an engine rotational speed Ne. It should be noted that the transmission required horsepower Htm is calculated by multiplying the aforementioned required traction force Tout by the present output rotational speed Nout.

The motor command determining part 83 is configured to determine command torques to be transmitted to the motors MG1 and MG2 to obtain the required traction force. The motor command determining part 83 is configured to determine command torques Tm1_ref and Tm2_ref to be respectively transmitted to the motors MG1 and MG2 from the target input shaft torque Te_ref and the target output shaft torque To_ref on the basis of torque balance information. The torque balance information defines a relation between the target input shaft torque Te_ref and the target output shaft torque To_ref to fulfill torque balance in the power transmission device 24. The torque balance information is stored in the storage part 56.

As described above, the Lo mode and the Hi mode have different paths of transmitting a driving force in the power transmission device 24. Thus, in determining the command torques Tm1_ref and Tm2_ref to be respectively transmitted to the motors MG1 and MG2, the motor command determining part 83 is configured to use different sets of torque balance information in the Lo mode and the High mode. When described in detail, the motor command determining part 83 is configured to determine command torques Tm1_Low and Tm2_Low to be respectively transmitted to the motors MG1 and MG2 in the Lo mode with use of first torque balance information indicated in the following Equation 1. In the present exemplary embodiment, the first torque balance information is composed of torque balance related formulas in the power transmission device 24.

$$Ts1\_Low = Te\_ref * r\_fr$$
$$Tc1\_Low = Ts1\_Low * (-1) * ((Zr1/Zs1)+1)$$
$$Tr2\_Low = To\_ref * (Zod/Zo)$$
$$Ts2\_Low = Tr2\_Low * (Zs2/Zr2)$$
$$Tcp1\_Low = Tc1\_Low + Ts2\_Low$$
$$Tm1\_Low = Tcp1\_Low * (-1) * (Zp1/Zp1d)$$
$$Tr1\_Low = Ts1\_Low * (Zr1/Zs1)$$
$$Tm2\_Low = Tr1\_Low * (-1) * (Zp2/Zp2d) \qquad \text{Equation 1}$$

Additionally, the motor command determining part 83 is configured to determine command torques Tm1_Hi and Tm2_Hi to be respectively transmitted to the motors MG1 and MG2 in the Hi mode with use of second torque balance information indicated in the following Equation 2. In the present exemplary embodiment, the second torque balance information is composed of torque balance related formulas in the power transmission device 24.

$$Ts1\_Hi = Te\_ref * r\_fr$$
$$Tc1\_Hi = Ts1\_Hi * (-1) * ((Zr1/Zs1)+1)$$
$$Tr2\_Hi = To\_ref * (Zod/Zo)$$
$$Ts2\_Hi = Tr2\_Hi * (Zs2/Zr2)$$
$$Tcp1\_Hi = Tc1\_Hi + Ts2\_Hi$$
$$Tm1\_Hi = Tcp1\_Hi * (-1) * (Zp1/Zp1d)$$
$$Tr1\_Hi = Ts1\_Hi * (Zr1/Zs1)$$
$$Tc2\_Hi = Tr2\_Hi * (-1) * ((Zs2/Zr2)+1)$$
$$Tcp2\_Hi = Tr1\_Hi + Tc2\_Hi$$
$$Tm2\_Hi = Tcp2\_Hi * (-1) * (Zp2/Zp2d) \qquad \text{Equation 2}$$

Here, contents of parameters in the respective sets of torque balance information are set as follows in Table 1.

TABLE 1

| | |
|---|---|
| Te_ref | The target input shaft torque |
| To_ref | The target output shaft torque |
| r_fr | A reduction ratio in the FR switch mechanism 65 (The FR switch mechanism 65 reduces the engine rotational speed to 1/r_fr and outputs it. The value of r_fr is negative when the FR switch mechanism 65 is in the forward moving state. The value of r_fr is positive when the FR switch mechanism 65 is in the rearward moving state.) |
| Zs1 | The number of teeth of the sun gear S1 in the first planetary gear mechanism 68 |
| Zr1 | The number of teeth of the ring gear R1 in the first planetary gear mechanism 68 |
| Zp1 | The number of teeth of the first carrier gear Gc1 |
| Zp1d | The number of teeth of the first motor gear Gm1 |
| Zs2 | The number of teeth of the sun gear S2 in the second planetary gear mechanism 69 |
| Zr2 | The number of teeth of the ring gear R2 in the second planetary gear mechanism 69 |
| Zp2 | The number of teeth of the first ring outer peripheral gear Gr1 |
| Zp2d | The number of teeth of the second motor gear Gm2 |
| Zo | The number of teeth of the second ring outer peripheral gear Gr2 |
| Zod | The number of teeth of the output gear 71 |

As described above, in the disconnected state that the third motor MG3 is neither connected to the first motor MG1 nor to the second motor MG2, the aforementioned command torques Tm1_ref and Tm2_ref will be command torques to be respectively transmitted to the motors MG1 and MG2. In the state that the third motor MG3 is connected to the first motor MG1, the command torque Tm1_ref is divided between the first motor MG1 and the third motor MG3, and the values of the divided torques will be command torques to be respectively transmitted to the motors MG1 and MG3. In the state that the third motor MG3 is connected to the second motor MG2, the command torque Tm2_ref is divided between the second motor MG2 and the third motor MG3, and the values of the divided torques will be command torques to be respectively transmitted to the motors MG2 and MG3.

Next, controlling of the engine 21 by the control unit 27 will be explained. As described above, the control unit 27 is configured to control the engine 21 by transmitting a command signal to the fuel injection device 28. A method of determining the command throttle value to be transmitted to the fuel injection device 28 will be hereinafter explained. The control unit 27 includes an engine requirement determining part 87 and a required throttle determining part 89.

The engine requirement determining part 87 is configured to determine an engine required horsepower Hdm on the basis of the work implement required horsepower Hpto, the transmission required horsepower Htm and the energy management required horsepower Hem. When described in detail, the engine requirement determining part 87 is configured to determine the engine required horsepower Hdm by totaling the work implement required horsepower Hpto, the transmission required horsepower Htm and the energy management required horsepower Hem.

The required throttle determining part 89 is configured to determine a command throttle value Th_cm from the engine required horsepower Hdm and the accelerator operating amount Aac. The required throttle determining part 89 is configured to determine the command throttle value Th_cm with use of an engine torque line Let and a matching line Lma, both of which are stored in the storage part 56. The engine torque line Let defines a relation between the output torque of the engine 21 and the engine rotational speed Ne. The matching line Lma is information for determining a first required throttle value from the engine required horsepower Hdm.

The required throttle determining part 89 is configured to determine the first required throttle value such that the engine torque line Let and the matching line Lma are matched in a matching point Pma1 at which the output torque of the engine 21 becomes a torque corresponding to the engine required horsepower Hdm. The required throttle determining part 89 is configured to determine, as the command throttle value Th_cm, a smaller one of the first required throttle value and a second required throttle value corresponding to the accelerator operating amount Aac.

Figure 6:
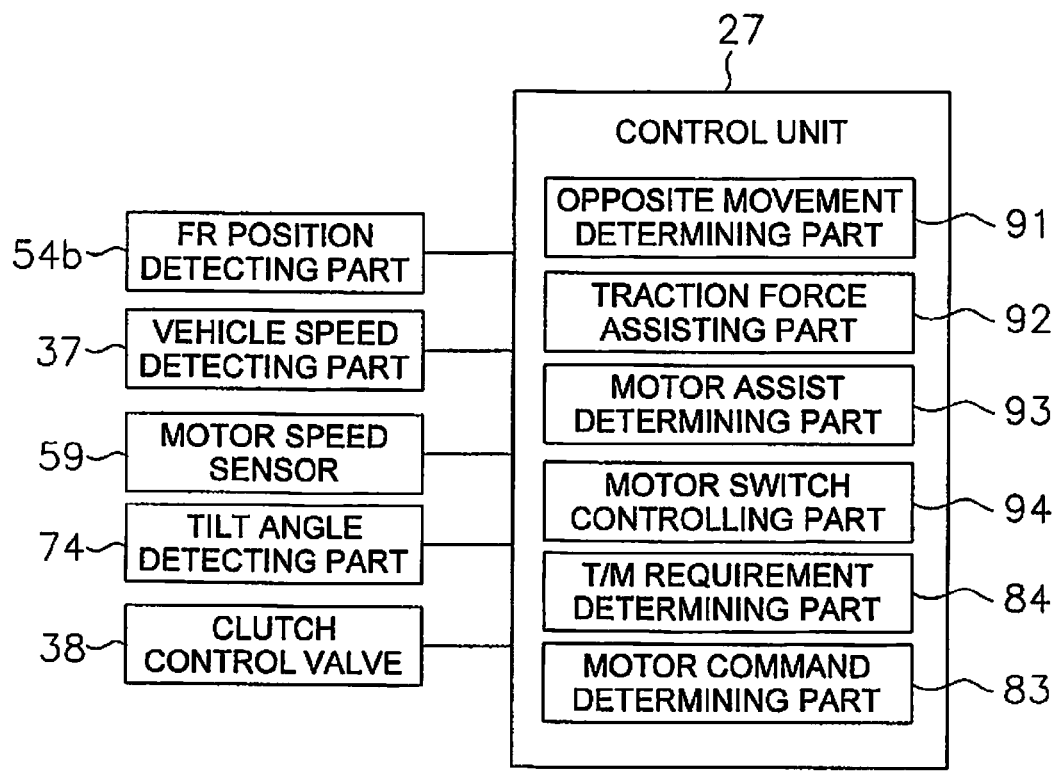
FIG. 6 is a control block diagram showing processing to be performed by the control unit.

Next, a traction force assisting control to be performed by the control unit 27 will be explained. The traction force assisting control is a control of reducing the vehicle speed in the opposite movement by increasing the required traction force in a moving direction corresponding to the position of the FR operating member 54a when the work vehicle 1 oppositely moves at a predetermined vehicle speed or greater. It should be noted that in the following explanation, the magnitude of, and increase/reduction in, each of the vehicle speed and the rotational speed are intended to mean the magnitude of, and increase/reduction in, the absolute value of the vehicle speed and the absolute value of the rotational speed. Additionally, where the traction force assisting control is not being performed, a traction force control will be referred to as a normal control. As shown in FIG. 6, the control unit 27 includes an opposite movement determining part 91 and a traction force assisting part 92.

Figure 7:
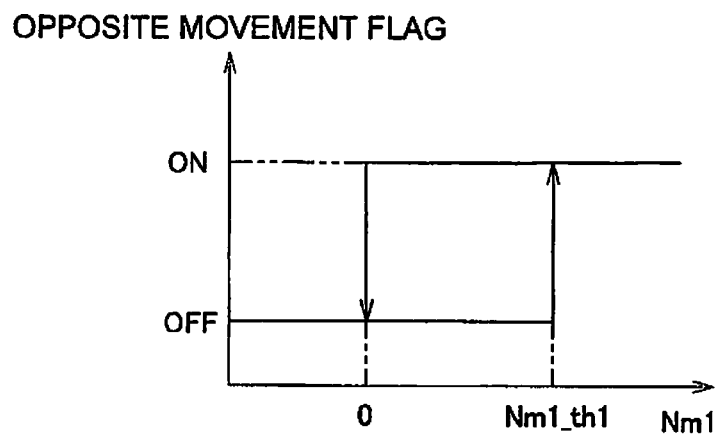
FIG. 7 is a diagram showing processing of determining opposite movement to be performed by an opposite movement determining part.

The opposite movement determining part 91 is configured to determine whether or not the work vehicle 1 is oppositely moving. FIG. 7 is a diagram showing opposite movement determination processing to be performed by the opposite movement determining part 91. FIG. 7 shows the determination processing when the position of the FR operating member 54a is the forward movement position. Therefore, in FIG. 7, the horizontal axis indicates a rotational speed Nm1 of the first motor MG1 corresponding to the vehicle speed in the rearward moving direction. As shown in FIG. 6, the work vehicle 1 includes a motor speed sensor 59. The motor speed sensor 59 is configured to detect the rotational speed and the rotational direction of the first motor MG1.

As shown in FIG. 7, when the rotational speed Nm1 of the first motor MG1 is greater than or equal to a predetermined first threshold Nm1_th1, an opposite movement flag is set to be ON. The fact that the opposite movement flag is ON means that the work vehicle 1 is determined as moving oppositely. The first threshold Nm1_th1 is greater than 0. When the rotational speed Nm1 of the first motor MG1 reduces to 0 from a value of the first threshold Nm1_th1 or greater, the opposite movement flag is set to be OFF. The fact that the opposite movement flag is OFF means that the work vehicle 1 is determined as not moving oppositely.

In low speed travelling that determination regarding opposite movement is performed, the power transmission device 24 is in the Lo mode, and the rotational speed of the first motor MG1 corresponds to the vehicle speed. Therefore, in the present exemplary embodiment, determination regarding opposite movement is performed on the basis of the rotational speed of the first motor MG1 instead of the vehicle speed. However, determination regarding opposite movement may be performed with direct use of the vehicle speed.

Similarly to the above, determination regarding opposite movement is also performed when the position of the FR operating member 54a is the rearward movement position. Put differently, the opposite movement flag is set to be ON when the position of the FR operating member 54a is the rearward movement position, and besides, when the rotational speed Nm1 of the first motor MG1 corresponding to the vehicle speed in the forward moving direction is greater than or equal to the first threshold Nm1_th1. Then, when the rotational speed Nm1 of the first motor MG1 decreases to 0 from a value of the first threshold Nm1_th1 or greater, the opposite movement flag is set to be OFF. It should be noted that different values may be set for the first threshold Nm1_th1 in the conditions when the position of the FR operating member 54a is the forward movement position and when the position of the FR operating member 54a is the rearward movement position.

Based on the aforementioned processing, the opposite movement determining part 91 is configured to determine that the work vehicle 1 is oppositely moving when the vehicle speed in the direction opposite to the moving direction corresponding to the position of the FR operating member 54a becomes a predetermined speed threshold or greater. In the following explanation, the moving direction corresponding to the position of the FR operating member 54a will be referred to as "an FR positional direction". The direction opposite to the moving direction corresponding to the position of the FR operating member 54a will be simply referred to as "an opposite direction".

The traction force assisting part 92 shown in FIG. 6 is configured to perform the traction force assisting control of increasing the required traction force in the FR positional direction when the opposite movement flag is ON, i.e., when the work vehicle 1 is determined as moving oppositely. On the other hand, the traction force assisting part 92 is configured to cancel the traction force assisting control when the opposite movement flag is OFF, i.e., when the work vehicle 1 is determined as not moving oppositely. In the traction force assisting control, the traction force assisting part 92 is configured to determine an assistive traction force dTout by a P control as indicated in the following Equation 3.

$$dTout = Kp * Nm1 \qquad \text{Equation 3}$$

Nm1 is the present rotational speed of the first motor MG1. The present rotational speed of the first motor MG1 is determined on the basis of a signal from the motor speed sensor 59. Kp is a P gain. The traction force assisting part 92 is configured to change the value of the P gain Kp in accordance with the rotational speed Nm1 of the first motor MG1.

Figure 8:
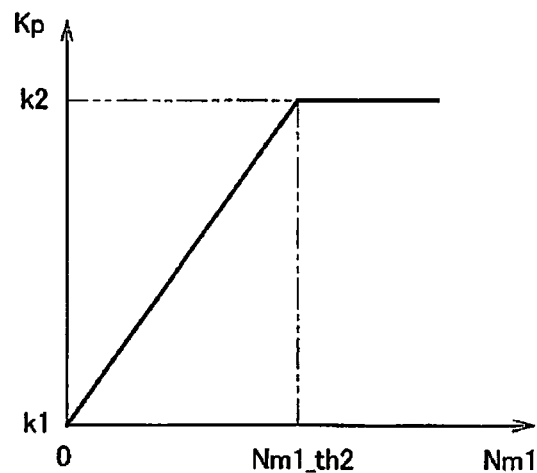
FIG. 8 is a chart showing a relation between the rotational speed of the first motor and P gain.

FIG. 8 is a chart showing a relation between the rotational speed Nm1 of the first motor MG1 and the P gain Kp. As shown in FIG. 8, when the rotational speed Nm1 of the first motor MG1 is 0, the P gain Kp is a predetermined first constant k1. When the rotational speed Nm1 of the first motor MG1 falls in a range from 0 to a predetermined second threshold Nm1_th2 or less, the P gain Kp increases with increase in the rotational speed Nm1 of the first motor MG1. When the rotational speed Nm1 of the first motor MG1 is greater than the second threshold Nm1_th2, the P gain Kp is a predetermined second constant k2. The second constant k2 is greater than the first constant k1.

The transmission requirement determining part 84 is configured to determine a required traction force Tout' in the traction force assisting control by adding the assistive traction force dTout to the aforementioned required traction force Tout in the normal control. It should be noted that in the present exemplary embodiment, the assistive traction force dTout is configured to be determined on the basis of the rotational speed Nm1 of the first motor MG1. However, as described above, in the low speed travelling that determination regarding opposite movement is performed, the rotational speed of the first motor MG1 corresponds to the vehicle speed. Thus, the assistive traction force dTout may be configured to be determined on the basis of the vehicle speed.

Figure 9:
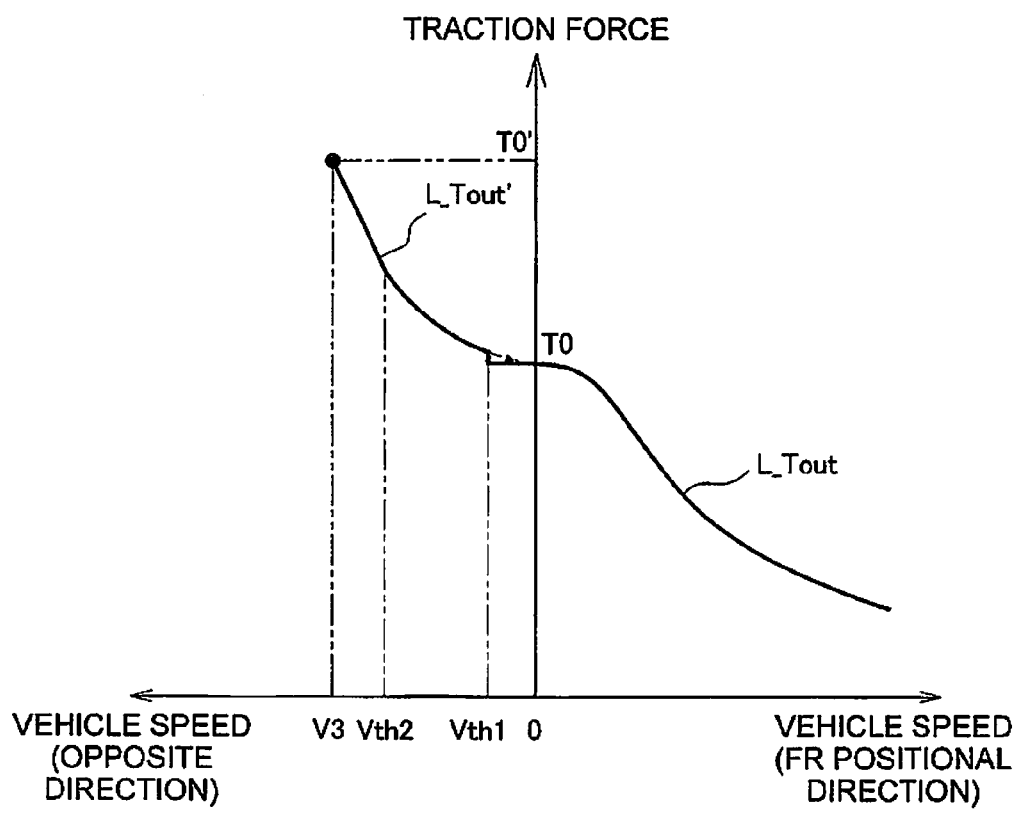
FIG. 9 is a diagram showing vehicle speed-traction force characteristics to be realized by a traction force assisting control.

FIG. 9 is a diagram showing vehicle speed-traction force characteristics to be implemented by the traction force assisting control. In FIG. 9, the horizontal axis indicates the vehicle speed. In FIG. 9, it is assumed that the vehicle speed in the FR positional direction gradually increases rightward from the position of a vehicle speed 0. Contrarily, it is assumed that the vehicle speed in the opposite direction gradually increases leftward from the position of the vehicle speed 0.

Figure 10:
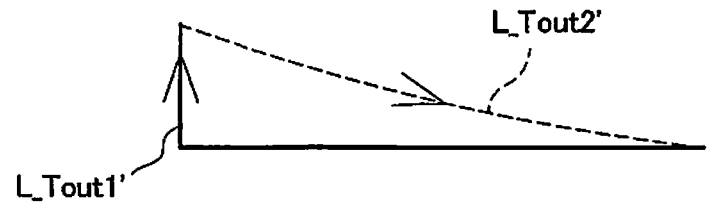
FIG. 10 is an enlarged diagram of the vehicle speed-traction force characteristics in FIG. 9.

In FIG. 9, a solid line L_Tout indicates a vehicle speed-traction force characteristic when the accelerator operating amount is 0 in the normal control. A solid line L_Tout' indicates a vehicle speed-traction force characteristic in the traction force assisting control, and herein, the accelerator operating amount is 0. FIG. 10 is an enlarged diagram showing the required traction force Tout' when the vehicle speed in the opposite direction falls in a range from 0 to a first speed threshold Vth1. When the vehicle speed is 0, the required traction force Tout is T0. In the required traction force characteristic information D1, the required traction force Tout is constant at T0 with respect to the vehicle speed in the opposite direction. Therefore, the traction force is constant at T0 when the vehicle speed in the opposite direction is greater than or equal to 0 and less than the predetermined first speed threshold Vth1. It should be noted that the first speed threshold Vth1 is a vehicle speed corresponding to the aforementioned first threshold Nm1_th1.

When the vehicle speed in the opposite direction becomes the first speed threshold Vth1 or greater, the opposite movement determining part 91 determines that the work vehicle 1 is oppositely moving. Accordingly, the traction force assisting control is started, and the traction force increases than in the normal control as indicated with the solid line L_Tout'.

On the other hand, in FIG. 9, a second speed threshold Vth2 is a vehicle speed corresponding to the aforementioned second threshold Nm1_th2. As shown in FIG. 8, when the rotational speed Nm1 of the first motor MG1 falls in the range from 0 to the second threshold Nm1_th2 or less, the P gain Kp gradually increases in a range from the first constant k1 to the second constant k2 with increase in the rotational speed Nm1 of the first motor MG1. Therefore, as shown in FIG. 9, when the vehicle speed in the opposite direction falls in a range from the first speed threshold Vth1 to the second speed threshold Vth2 or less, the traction force more gently increases than when the vehicle speed in the opposite direction is greater than the second speed threshold Vth2.

When the vehicle speed in the opposite direction is greater than the second speed threshold Vth2, the P gain KP is the predetermined second constant k2. Accordingly, when the vehicle speed in the opposite direction is greater than the second speed threshold Vth2, the traction force increases with a larger gradient than when the vehicle speed in the opposite direction falls in the range from the first speed threshold Vth1 to the second speed threshold Vth2 or less.

When the traction force by the traction force assisting control reaches a magnitude T0' that is balanced with a force of oppositely moving the work vehicle 1 on a hill, the vehicle speed in the opposite direction stops increasing at V3 and becomes constant. Under the condition, when the operator operates the accelerator operating member 51a to increase the accelerator operating amount, the traction force increases and thereby the vehicle speed in the opposite direction decreases. Then, when the vehicle speed reaches 0, the traction force assisting control is cancelled.

Moreover, as shown in FIG. 6, the work vehicle 1 preferably includes a tilt angle detecting part 74, a motor assistance determining part 93 and a motor switch controlling part 94. The tilt angle detecting part 74 is an accelerometer, for instance, and is configured to detect the tilt angle of the vehicle. The motor assistance determining part 93 is configured to determine whether or not the tilt angle is greater than or equal to a predetermined first angular threshold A1. When the tilt angle is greater than or equal to the predetermined first angular threshold A1 in the traction force assisting control, the motor switch controlling part 94 is configured to control the motor switch mechanism 73 to switch the third motor MG3 into the first connected state. Accordingly, the third motor MG3 is connected to the first motor MG1 and is switched into a state of assisting the first motor MG1.

It should be noted that when the tilt angle changes from an angle of the predetermined first angular threshold A1 or greater into an angle of a predetermined second angular threshold A2 or less, the motor switch controlling part 94 is configured to switch the third motor MG3 from the first connected state to the disconnected state. The second angular threshold A2 is less than the first angular threshold A1.

The work vehicle 1 according to the present exemplary embodiment has the following features.

When the work vehicle 1 oppositely moves at a vehicle speed of the predetermined first speed threshold Vth1 or greater, the required traction force is increased by the traction force assisting control. Accordingly, the vehicle speed attributed to opposite movement is automatically reduced, and over-rotation of the motor MG1, MG2 can be easily prevented.

Figure 11:
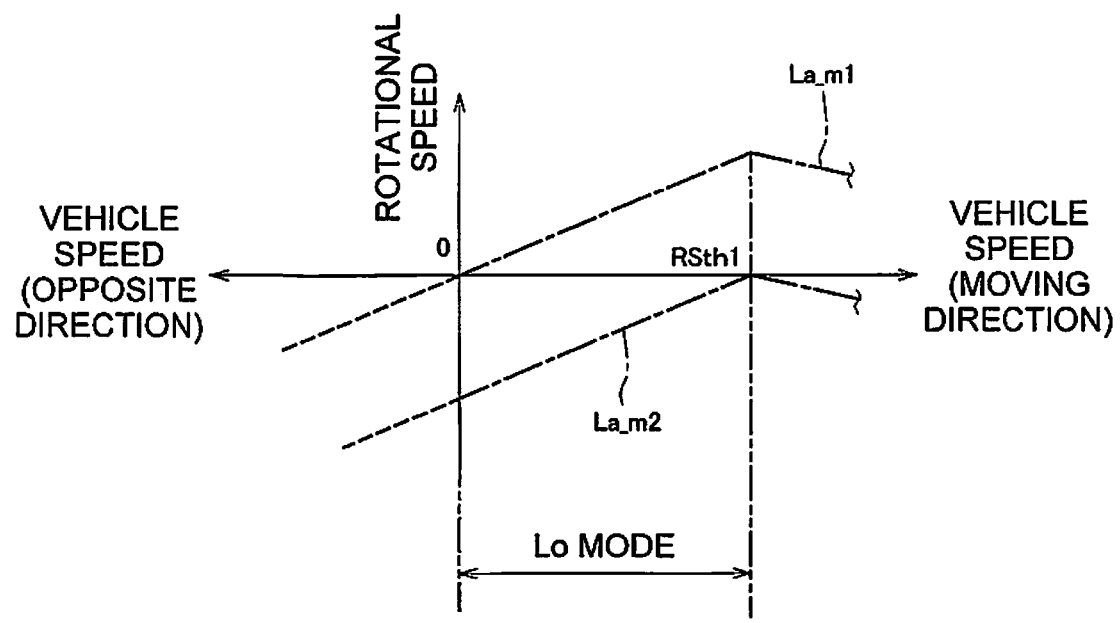
FIG. 11 is a chart showing a relation between the vehicle speed and the rotational speeds of the first and second motors in opposite movement.

Especially when the vehicle speed is 0, the rotational speed of the second motor MG2 is higher than that of the first motor MG1. Hence, over-rotation of the second motor is likely to be caused in opposite movement. FIG. 11 is a chart showing a relation between the rotational speeds of the first and second motors MG1 and MG2 and the vehicle speed in opposite movement. It should be noted that in this explanation, the magnitude of, and increase/reduction in, rotational speed are intended to mean the magnitude of, and increase/reduction in, the absolute value of the rotational speed.

In opposite movement, the rotational speed of the second motor MG2 increases with an increase in vehicle speed in the opposite direction. At this time, the rotational speed of the first motor MG1 also increases in the same direction as the rotational direction of the second motor MG2. However, the rotational speed of the second motor MG2 is higher than that of the first motor MG1. Therefore, when the vehicle speed increases in the opposite direction, the rotational speed of the second motor MG2 reaches an over-rotation state earlier than the first motor MG1. In the work vehicle 1 according to the present exemplary embodiment, the vehicle speed attributed to opposite movement is automatically reduced by the traction force assisting control. Accordingly, over-rotation of the second motor MG2 can be easily prevented.

When the tilt angle is greater than or equal to the predetermined first angular threshold A1 in the traction force assisting control, the third motor MG3 is configured to be connected to the first motor MG1. Therefore, the third motor MG3 is configured to assist the first motor MG1 when the work vehicle 1 oppositely moves on a steep slope. Therefore, a traction force for inhibiting opposite movement can be quickly generated on the steep slope. For example, even when the required traction force Tout' determined by the traction force assisting control is greater than the upper limit torque of the first motor MG1, the third motor MG3 assists the first motor MG1, and hence, a torque corresponding to the required traction force Tout' can be quickly outputted.

When the vehicle speed in the opposite direction has fallen in the predetermined second speed range Vth2 since starting of the traction force assisting control, the required traction force Tout' is configured to be more gently increased than when the vehicle speed in the opposite direction has been greater than the predetermined second speed range Vth2. Therefore, a large variation in traction force can be inhibited in starting of the traction force assisting control. Accordingly, occurrence of shock in the work vehicle 1 can be inhibited.

One exemplary embodiment of the present invention has been explained above. However, the present invention is not limited to the aforementioned exemplary embodiment, and a variety of changes can be made without departing from the scope of the present invention.

The application target of the present invention is not limited to the EMT and may be another type of transmission, such as the HMT. In this case, the first motor MG1, the second motor MG2 and the third motor MG3 function as hydraulic motors and hydraulic pumps. The first motor MG1, the second motor MG2 and the third motor MG3 are variable displacement pumps/motors, and displacements thereof are configured to be controlled by the control unit 27.

The construction of the power transmission device 24 is not limited to that in the aforementioned exemplary embodiment. For example, connections and positional arrangements of the respective elements in the two planetary gear mechanisms 68 and 69 are not limited to those in the aforementioned exemplary embodiment. The number of the planetary gear mechanisms is not limited to two. For example, the power transmission device 24 may be provided with one planetary gear mechanism.

The third motor MG3 may not be provided. In this case, the first motor MG1 is not assisted by the third motor MG3 in the aforementioned traction force assisting control. Alternatively, the second motor MG2 may not be provided. In this case, the work vehicle 1 may be provided with only one motor. Yet alternatively, the work vehicle 1 may be provided with only the first motor MG1 and the third motor MG3, i.e., an assistive motor.

In the aforementioned exemplary embodiment, the magnitude of the P gain Kp is configured to be changed in accordance with the rotational speed of the first motor MG1. However, the value of the P gain Kp may be constant regardless of the rotational speed of the first motor MG1.

In the aforementioned exemplary embodiment, it is configured to be determined whether or not the work vehicle 1 oppositely moves on the basis of the rotational speed of the first motor MG1. However, it may be configured to be determined whether or not the work vehicle 1 oppositely moves on the basis of a deviation between the target rotational speed of the first motor MG1 and the present rotational speed Nm1 of the first motor MG1. Put differently, the aforementioned exemplary embodiment relates to the exemplary case that the target rotational speed is 0, but the target rotational speed may have a value other than 0. A target value for reducing the vehicle speed attributed to opposite movement has been preliminarily set for either the target vehicle speed or the target rotational speed of the first motor MG1, and has been stored in the storage part 56.

In the aforementioned exemplary embodiment, the assistive traction force dTout is configured to be determined on the basis of the rotational speed Nm1 of the first motor MG1. However, the assistive traction force dTout may be configured to be determined on the basis of a deviation between the target rotational speed of the first motor MG1 and the present rotational speed Nm1 of the first motor MG1. Put differently, the assistive traction force dTout may be configured to be determined on the basis of a deviation between the target vehicle speed and the present vehicle speed. A target value for reducing the vehicle speed attributed to opposite movement has been preliminarily set for either the target vehicle speed or the target rotational speed of the first motor MG1.

The first threshold Nm1_th1 or the first speed threshold Vth1 may be 0.

According to exemplary embodiments of the present invention, it is possible to provide a work vehicle that is capable of easily preventing over-rotation of a motor attributed to opposite movement.

The invention claimed is:

1. A work vehicle, comprising:
an engine;
a hydraulic pump configured to be driven by the engine;
a work implement configured to be driven by a hydraulic fluid discharged from the hydraulic pump;
a travel device configured to be driven by the engine;
a power transmission device configured to transmit a driving force from the engine to the travel device;
a control unit configured to control the power transmission device;
a forward/rearward movement operating member for switching between forward movement and rearward movement of the vehicle, the forward/rearward movement operating member being configured to be selectively switched at least between a forward movement position and a rearward movement position;
an accelerator operating member;
an accelerator operation detecting part configured to detect an operating amount of the accelerator operating member; and
a vehicle speed detecting part configured to detect a vehicle speed,
the power transmission device including
an input shaft,
an output shaft,
a gear mechanism having a planetary gear mechanism and configured to transmit a rotation of the input shaft to the output shaft, and
a motor connected to a rotary element of the planetary gear mechanism,
the power transmission device being configured to change a rotational speed ratio of the output shaft to the input shaft by changing a rotational speed of the motor,
the control unit including
a storage part storing a required traction force characteristic, the required traction force characteristic defining a relation between a required traction force and an output rotational speed, the output rotational speed being a rotational speed of the output shaft of the power transmission device, the required traction force characteristic being set such that the required traction force increases with an increase in the operating amount of the accelerator operating member,
a required traction force determining part configured to determine the required traction force corresponding to the output rotational speed based on the required traction force characteristic, a motor command determining part configured to determine a command torque to be transmitted to the motor to obtain the required traction force, an opposite movement determining part configured to determine that the vehicle is oppositely moving when the vehicle speed becomes a predetermined speed threshold or greater in a direction opposite to a moving direction corresponding to a position of the forward/rearward movement operating member, and a traction force assisting part configured to perform a traction force assisting control of increasing the required traction force in the moving direction corresponding to the position of the forward/rearward movement operating member when it is determined that the vehicle is oppositely moving.

2. The work vehicle according to claim 1, wherein
the motor is a first motor to be connected to a first rotary element of the planetary gear mechanism,
the power transmission device further includes a second motor to be connected to a second rotary element of the planetary gear mechanism,
a rotational speed of the second motor is greater than the rotational speed of the first motor when the vehicle speed is 0,
the rotational speed of the second motor increases with an increase in the vehicle speed in the opposite direction when the vehicle is oppositely moving, and
the motor command determining part is configured to determine the command torque to be transmitted to the first motor and a command torque to be transmitted to the second motor to obtain the required traction force.

3. The work vehicle according to claim 1, further comprising
an assistive motor for assisting the motor;
a motor switch mechanism for switching between a state of assisting the motor by the assistive motor and a state of not assisting the motor by the assistive motor; and
a tilt angle detecting part configured to detect a tilt angle of the vehicle,
the control unit further including
a motor assistance determining part configured to determine whether or not the tilt angle is greater than or equal to a predetermined angular threshold, and
a motor switch controlling part configured to perform a control of causing the motor switch mechanism to switch into the state of assisting the motor by the assistive motor when the tilt angle is greater than or equal to the predetermined angular threshold.

4. The work vehicle according to claim 1, wherein in the traction force assisting control, the traction force assisting part is configured to increase the required traction force with an increase in the vehicle speed in the opposite direction.

5. The work vehicle according to claim 4, wherein when the vehicle speed in the opposite direction is within a predetermined speed range since starting of the traction force assisting control, the required traction force is configured to be more gently increased than when the vehicle speed in the opposite direction is greater than the predetermined speed range.

6. The work vehicle according to claim 1, wherein the opposite movement determining part is configured to determine that the vehicle is oppositely moving when the position of the forward/rearward movement operating member is the forward movement position and the vehicle speed in a rearward direction becomes the predetermined speed threshold or greater.

7. The work vehicle according to claim 1, wherein the opposite movement determining part is configured to determine that the vehicle is oppositely moving when the position of the forward/rearward movement operating member is the rearward movement position and the vehicle speed in a forward direction becomes the predetermined speed threshold or greater.

8. A method of controlling a work vehicle, the work vehicle including
an engine,
a hydraulic pump configured to be driven by the engine,
a work implement configured to be driven by an hydraulic fluid discharged from the hydraulic pump,
a travel device configured to be driven by the engine,
a power transmission device being configured to transmit a driving force from the engine to the travel device,
a forward/rearward movement operating member for switching between forward movement and rearward movement of the vehicle, the forward/rearward movement operating member being configured to be selectively switched at least between a forward movement position and a rearward movement position,
an accelerator operating member,
an accelerator operation detecting part configured to detect an operating amount of the accelerator operating member, and
a vehicle speed detecting part configured to detect a vehicle speed,
the power transmission device including
an input shaft,
an output shaft,
a gear mechanism having a planetary gear mechanism and being configured to transmit a rotation of the input shaft to the output shaft, and
a motor connected to a rotary element of the planetary gear mechanism,
the power transmission device being configured to change a rotational speed ratio of the output shaft to the input shaft by changing a rotational speed of the motor,
the method comprises the steps of
determining a required traction force corresponding to an output rotational speed based on a required traction force characteristic, the required traction force characteristic defining a relation between the required traction force and the output rotational speed, the output rotational speed being a rotational speed of the output shaft of the power transmission device, the required fraction force characteristic being set such that the required traction force increases with increase in the operating amount of the accelerator operating member,
determining a command torque to be transmitted to the motor se-as to obtain the required traction force,
determining that the vehicle is oppositely moving when the vehicle speed becomes a predetermined speed threshold or greater in a direction opposite to a moving direction corresponding to a position of the forward/rearward movement operating member, and
performing a traction force assisting control of increasing the required traction force in the moving direction corresponding to the position of the forward/rearward movement operating member when it is determined that the vehicle is oppositely moving.

9. The work vehicle according to claim 2, further comprising
an assistive motor for assisting the motor;
a motor switch mechanism for switching between a state of assisting the motor by the assistive motor and a state of not assisting the motor by the assistive motor; and
a tilt angle detecting part configured to detect a tilt angle of the vehicle,
the control unit further including
a motor assistance determining part configured to determine whether or not the tilt angle is greater than or equal to a predetermined angular threshold, and
a motor switch controlling part configured to perform a control of causing the motor switch mechanism to switch into the state of assisting the motor by the assistive motor when the tilt angle is greater than or equal to the predetermined angular threshold.

10. The work vehicle according to claim 9, wherein in the traction force assisting control, the traction force assisting part is configured to increase the required traction force with an increase in the vehicle speed in the opposite direction.

11. The work vehicle according to claim 10, wherein when the vehicle speed in the opposite direction is within a predetermined speed range since starting of the traction force assisting control, the required traction force is configured to be more gently increased than when the vehicle speed in the opposite direction is greater than the predetermined speed range.

12. The work vehicle according to claim 11, wherein the opposite movement determining part is configured to determine that the vehicle is oppositely moving when the position of the forward/rearward movement operating member is the forward movement position and the vehicle speed in a rearward direction becomes the predetermined speed threshold or greater.

* * * * *